(12) United States Patent
Momose

(10) Patent No.: US 6,182,896 B1
(45) Date of Patent: *Feb. 6, 2001

(54) INFORMATION DETECTION APPARATUS AND INFORMATION DETECTION METHOD FOR RECORDING MEDIA

(75) Inventor: Tsutomu Momose, Suwa (JP)

(73) Assignee: Seiko Epson Corporation, Tokyo (JP)

( * ) Notice: Under 35 U.S.C. 154(b), the term of this patent shall be extended for 0 days.

This patent is subject to a terminal disclaimer.

(21) Appl. No.: 09/395,133

(22) Filed: Sep. 13, 1999

Related U.S. Application Data

(63) Continuation of application No. 08/863,446, filed on May 22, 1997, now Pat. No. 5,965,862, which is a continuation-in-part of application No. 08/544,528, filed on Oct. 18, 1995, now Pat. No. 5,789,727.

(30) Foreign Application Priority Data

| Oct. 18, 1994 | (JP) | 6-252507 |
|---|---|---|
| Dec. 27, 1994 | (JP) | 6-326487 |
| Jun. 30, 1995 | (JP) | 7-166555 |
| Aug. 4, 1995 | (JP) | 7-199822 |
| May 22, 1996 | (JP) | 8-127537 |

(51) Int. Cl.$^7$ ..................... G06K 7/08
(52) U.S. Cl. ............... 235/449; 235/439; 235/475; 235/486; 235/493
(58) Field of Search ................ 235/449, 439, 235/493, 475, 486, 436, 379, 435, 480; 271/902, 265.01; 902/18; 400/73

(56) References Cited

U.S. PATENT DOCUMENTS

| 3,296,605 | 1/1967 | Raddin et al. | 235/449 X |
|---|---|---|---|
| 3,815,497 | 6/1974 | Wallace | 902/18 X |
| 3,851,115 | 11/1974 | Zacaroli | 360/126 X |
| 4,097,910 | 6/1978 | Lafevers et al. | 360/126 |
| 4,196,186 | 4/1980 | Bogoch | 235/475 |
| 4,196,846 | 4/1980 | Kao et al. | 235/475 |
| 4,239,151 | 12/1980 | Enser et al. | 235/449 X |
| 4,287,409 | 9/1981 | Auchinleck | 235/475 |
| 4,315,246 | 2/1982 | Milford | 235/449 X |
| 4,384,197 | 5/1983 | Kawakami | 235/449 X |

(List continued on next page.)

FOREIGN PATENT DOCUMENTS

| 34 45734 | 7/1985 | (DE) . |
|---|---|---|
| 37 04059 | 8/1988 | (DE) . |
| 0 179 502 | 4/1986 | (EP) . |
| 0 191 678 | 8/1986 | (EP) . |
| 0 223 395 | 5/1987 | (EP) . |

(List continued on next page.)

Primary Examiner—Michael G Lee

(57) ABSTRACT

An information detection apparatus and information detection method for processing recording media to ascertain validity of checks and other negotiable instruments and print as necessary on the recording media. The information detection apparatus for processing recording media comprises in sequence along transportation path 1009 from the insertion opening 1006 a recording medium transportation mechanism 1003, printing mechanism 1004, and reading mechanism 1005. When a recording medium 1008 is transported by transportation mechanism 1003 along transportation path 1009 to a predetermined position, the check is positioned between presser roller 1051 and a detector 1052 of reading mechanism 1005. Presser roller 1051 then presses recording medium 1008 against detector 1052 while transportation mechanism 1003 pulls the recording medium and particular information recorded to the recording medium is detected. This operation straightens wrinkles and removes slack from recording medium 1008 to reduce reading errors. Based on the read information, a printing process is then executed by printing mechanism 4 and the recording medium is ejected from insertion opening 1006.

12 Claims, 31 Drawing Sheets

U.S. PATENT DOCUMENTS

| | | | |
|---|---|---|---|
| 4,593,183 | 6/1986 | Fukatsu | 235/379 |
| 4,613,747 | 9/1986 | McCarthy | 235/480 |
| 4,617,457 | 10/1986 | Granzow et al. | 902/18 X |
| 4,619,197 | 10/1986 | Pailler | 400/621 X |
| 4,634,263 | 1/1987 | Miwa | 271/270 X |
| 4,684,794 | 8/1987 | Holland-Letz | 235/449 |
| 4,731,524 | 3/1988 | Brooks | 235/449 X |
| 4,786,789 | 11/1988 | Gaucher | 235/432 |
| 4,806,744 | 2/1989 | Briane et al. | 235/477 |
| 4,847,475 | 7/1989 | Watabe et al. | 235/480 X |
| 4,871,905 | 10/1989 | Mita et al. | 235/449 X |
| 4,874,161 | 10/1989 | Murasaki et al. | 271/265 |
| 5,014,324 | 5/1991 | Mazumder | 235/449 X |
| 5,045,674 | 9/1991 | Mita et al. | 235/439 |
| 5,053,607 | 10/1991 | Carlson et al. | 235/379 |
| 5,146,070 | 9/1992 | Toma | 235/475 |
| 5,157,246 | 10/1992 | Nakanishi | 235/449 X |
| 5,218,173 | 6/1993 | Garwin et al. | 178/18 |
| 5,294,785 | 3/1994 | Fukuda et al. | 235/477 |
| 5,326,179 | 7/1994 | Fukai et al. | 400/120 |
| 5,362,951 | 11/1994 | Kanazawa et al. | 235/449 |
| 5,393,966 | 2/1995 | Gatto et al. | 235/449 X |
| 5,420,406 | 5/1995 | Lzawa et al. | 235/449 |
| 5,430,280 | 7/1995 | Kikuchi | 235/449 |
| 5,438,186 | 8/1995 | Nair et al. | 235/449 |
| 5,466,914 | 11/1995 | Kitahara | 235/475 X |
| 5,479,532 | 12/1995 | Abel et al. | 235/449 X |
| 5,483,050 | 1/1996 | Fukasawa | 235/449 |
| 5,491,327 | 2/1996 | Saroya | 235/449 |
| 5,789,727 | 8/1998 | Teradaira et al. | 235/449 |
| 5,965,862 * | 10/1999 | Momose | 235/449 |

FOREIGN PATENT DOCUMENTS

| | | |
|---|---|---|
| 0 398 515 | 11/1990 | (EP) . |
| 0 437 724 | 7/1991 | (EP) . |
| 2 180 679 | 4/1987 | (GB) . |
| 58-208878 | 12/1983 | (JP) . |
| 63-87668 | 6/1988 | (JP) . |
| 1-116968 | 8/1989 | (JP) . |
| 2-267773 | 11/1990 | (JP) . |
| 4-31067 | 2/1992 | (JP) . |
| WO 94/10649 | 5/1994 | (WO) . |

* cited by examiner much leakage less leakage

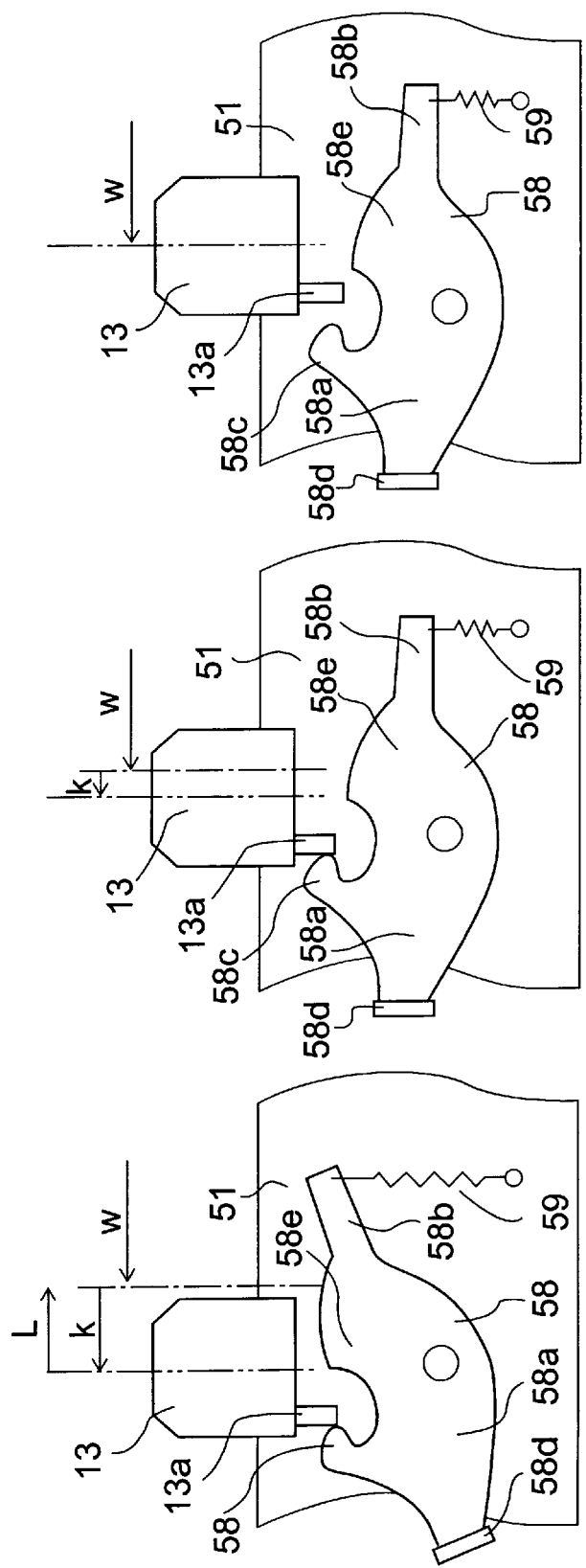

INFORMATION DETECTION APPARATUS AND INFORMATION DETECTION METHOD FOR RECORDING MEDIA

CONTINING APPLICATION

This application is a continuation of application Ser. No. 08/863,446, filed May 22, 1997, now U.S. Pat. No. 5,965,862 which is a continuation-in-part of application Ser. No. 08/544,528 filed Oct. 18, 1995 and issued as U.S. Pat. No. 5,789,727, the contents of each of which are incorporated herein by reference.

BACKGROUND OF THE INVENTION

1. Field of the Invention

The present invention relates to an apparatus for detecting information recorded on a recording media and to an information detection method for processing recording media. The present invention relates particularly to an apparatus and method for reading content recorded with magnetic ink on recording media such as checks and negotiable instruments, and printing to the recording media.

2. Description of the Related Art

Personal checks are commonly used in place of cash or credit cards to pay for purchases made at retail establishments. Personal checks are issued by financial institutions such as, banks, and are generally imprinted on one side with the account number of the user, a serial tracking number, routing codes, and other information. The validity or invalidity of a personal check can be confirmed by referring to this data.

MICR codes are classified as E13B or CMC7 codes based on differences in character shape, print quality and other standards, and the MICR printing position on the check is also standardized. Because the MICR codes are printed using a magnetic ink, the MICR codes can be converted to a current waveform by passing the check over the magnetic head magnetized by a magnet. Because the waveforms differ according to the character represented, the characters can be recognized by analyzing the current waveforms.

Apparatuses for reading these MICR codes have been commonly used for many years, and are known as magnetic ink character readers (also MICR). The MICR reads the imprinted MICR codes as a personal check is passed over the magnetic head. The magnetic head output is then interpreted and converted to character data, which is then output through an interface to the POS terminal controller.

When a store receives a check from a customer and the check is confirmed valid using the MICR, the check is then endorsed by printing check approval, the store name, store account number, and/or other information on the back of the check. Because this endorsement is commonly printed by a printer, the operator must remove the check from the MICR and set it into the printer. The check is then stored after being endorsed to complete personal check processing.

To process a personal check at a POS station in a retail establishment, the personal check must be passed through the MICR and then set into the printer, and the operator must therefore repeatedly set each personal check into plural devices installed at the POS station, i.e., the MICR and the printer. If the personal check is inserted to either device with the front and back of the check improperly positioned, MICR character recognition will fail or the endorsement will be printed to the wrong side of the check.

Furthermore, this process can be inherently confusing because the insertion direction and orientation of the check front and back differ, and the processing time per customer is inevitably increased.

To simplify this sequence of operations the inventor has previously developed a device for sequentially accomplishing MICR text reading and endorsement printing using a magnetic head and print head disposed to a single transportation path. This device is described and claimed in parent application Ser. No. 08/544,528. This device is described briefly below with reference to FIG. 31, a simplified side view of a data detection means for processing checks as the recording medium. As shown in FIG. 31 this data detection means comprises a print head 1105 and a magnetic head 1106. In this data detection means the opening 1107 to which the check is inserted is provided in the space 1104 at the front of the device, and the check is inserted horizontally from opening 1107.

Transport roller 1108 is disposed between opening 1107 and paper transport path 1110. When the leading edge of the check inserted from opening 1107 reaches the bottom of transport roller 1108, presser roller 1109 lifts to press the check against transport roller 1108. When a drive mechanism not shown in the figure then operates, transport roller 1108 rotates in the direction transporting the check into paper transport path 1110.

Magnetic head 1106 is disposed on the back side of paper transport path 1110. Transport roller 1112, which is driven by belt 1111 to rotate in synchronization with transport roller 1108, is disposed opposing magnetic head 1106 from the other side of paper transport path 1110 such that the check (recording medium) passes therebetween. When the leading edge of the check reaches magnetic head 1106, transport roller 1112 is moved against the check to press the check against magnetic head 1106 while continuing to transport the check through the paper transport path 1110. Magnetic head 106 is thus able to detect the magnetic ink in contact with the check, and can thus read the information printed using magnetic ink characters with good precision.

Paper transport path 1110 is formed curving gently upward with print head 1105 disposed at the top end of the path. Another transport roller 1113, which rotates synchronized to presser roller 1109 and transport roller 1112, is disposed between print head 1105 and magnetic head 1106. After the check is transported by presser roller 1109 and transport roller 1112 through the paper transport path 1110 and is read by magnetic head 1106, it is transported further upward by transport roller 1113. After the entire check is advanced to a vertical position, specific information is printed by the print head 1105, and the check is then ejected from opening 1114 at the top of the data detection means to complete check processing.

This type of recording media information detection apparatus is widely used because it enables checks to be processed without using separate reading and printing devices.

With the check transported by synchronously rotating transport rollers 1108, 1112, and 1113, however, there is no tension applied by the transport rollers to stretch and straighten the check. This means that the pressure applied by the transport roller 1112 to the check must be high in order to assure positive contact against magnetic head 1106 when the check is wrinkled or creased. Because of the high pressure required, the apparatus tends to become larger and more expensive because of the measures that must be taken to assure sufficient durability in the bearings of transport roller 1112 and the detection surface of magnetic head 1106.

Furthermore, when this type of information detection apparatus is used for check processing, the operator's eyes and hands must travel back and forth between space 1104 at the front of the apparatus and opening 1114 at the top of the apparatus. As a result, the inconvenience of check processing is not completely resolved.

OBJECTS OF THE INVENTION

Therefore, an object of the present invention is to provide an integrated processing apparatus comprising both MICR and printer (simply an integrated processing apparatus below) whereby the operations required of the operator can be simplified and the entire personal check processing operation from MICR reading to endorsement can be continuously executed.

It is a further object of the present invention to further improve the prior art as described above by providing a compact, low-cost, information detection apparatus for recording media processing with improved operability, and a processing method therefor.

SUMMARY OF THE INVENTION

Personal check processing can be accomplished in a short period of time without errors by means of an integrated processing apparatus of the present invention, and customer service can therefore be improved and operator fatigue reduced.

Many functions are required of POS stations installed in retail stores, and the area occupied by such POS stations has a tendency to grow as new apparatuses are added to achieve these various functions. Because conventional printer and MICR units are separate devices, sufficient space must be provided to accommodate these two pieces of hardware. Furthermore, separate interfaces connecting the printer and MICR to the host device must also be provided and controlled.

An integrated processing apparatus of the present invention, however, reduces the required installation space, simplifies operation for the operator, and enables the design of POS stations to provide excellent functionality and aesthetics.

As POS station functionality increases, personal computers have been used as the POS station controller; some of such controllers are also capable of providing the operator with appropriate guidance and help. However, as operation becomes more complex and the size of the help program increases, the processing speed (throughput) of the personal computer may drop.

An integrated processing apparatus of the present invention, however, resolves one source of operating complexity, and can therefore resolve the problem of reduced throughput.

To achieve the above objects and combine the MICR code reading function and endorsement printing function, an integrated processing apparatus of the present invention disposes a magnetic head and a print head in the paper path common to these functions. More specifically, an integrated processing apparatus of the present invention comprises a paper path for guiding recording media; at least one magnetic head capable of reading an MICR code and disposed in the paper path facing at least one side of the recording media; and a print head capable of printing to at least one side of the recording media transported through the paper path.

Reading the MICR code imprinted on a personal check or other cut-sheet form, and printing data on the cut-sheet form, can be continuously executed by a single apparatus because the integrated processing apparatus of the present invention has both the magnetic head and the print head disposed on a common paper path. It is therefore not necessary for the operator to reset the cut-sheet form to separate devices, and plural processes can be reliably completed in a short period of time. Furthermore, by combining two functions in a single apparatus, the number of devices installed to the POS station can be reduced, the POS station size can therefore reduced, and a POS station that is easy to use and aesthetically pleasing can be achieved.

By means of this integrated processing apparatus, plural processes, including MICR code reading, initial setting of the cut-sheet form to the print head, MICR code recognition nearly simultaneous with cut-sheet form setting, and cut-sheet form printing by the print head, can be continuously executed without intervention by the operator. It is also possible to print automatically when the MICR code is determined valid, and to eject the cut-sheet form from the paper path without printing when the MICR code is not determined valid. Therefore, even though plural functions are combined, the operator can respond flexibly as needed according to MICR code recognition. If reading is not possible or the read data cannot be confirmed for some reason, the cut-sheet form is simply ejected, and the operator can respond by reinserting the cut-sheet form correctly or taking other appropriate measures.

To enable even greater flexibility, a process for ejecting the cut-sheet form from the paper path during the confirmation process is provided so that processing can be canceled during the confirmation process. It is also possible to specify the start of MICR code reading, and to then cancel the start of reading during insertion of the cut-sheet form to the paper path before MICR code reading actually starts.

A common transport means capable of transporting the cut-sheet form in the paper path to both the print head and the magnetic head can also be provided as an effective means of minimizing the size of an integrated processing apparatus of the present invention. By using a common transport means, the space required for installing the transport means in the apparatus is reduced, and the total length of the paper path is shortened. The total number of parts is also reduced, and the number of required interfaces is reduced, thus leading to reduced manufacturing costs and simplification of the system incorporating an integrated processing apparatus.

When a common transport means is used, two transport speeds are also preferably used, a low speed for advancing the cut-sheet form to the print head, and a high speed for advancing the cut-sheet form to the magnetic head. When reading the MICR code, a relatively high transport speed is preferable to maintain the specified recognition rate. A relatively low transport speed is preferable during printing, however, to assure the desired print quality. By thus providing transport speeds suited to the respective functions, these different processes can be reliability executed.

To stabilize the transport speed during MICR code reading, first and second rollers are preferably disposed to the paper path before and after the magnetic head. Because the cut-sheet form is held by at least one of the rollers as it passes the magnetic head, the cut-sheet form can be transported at a stable speed.

To further improve the MICR recognition rate, a media presser capable of pressing the cut-sheet form toward the detection surface of the magnetic head is preferably disposed at a position opposite the magnetic head in the paper path. The cut-sheet forms inserted to the paper path may have been folded, wrinkled, and otherwise damaged in various ways. If the cut-sheet form is pressed to the magnetic head by the media presser, the cut-sheet form can be held tightly to the magnetic head during MICR code reading, and reading errors can be prevented. It is sufficient to provide to contact members in this media presser arrayed in series in the direction perpendicular to the direction in which the paper travels, and the magnetic head and cut-sheet form can be held together with a known amount of pressure by providing one of these contact members in opposition to the magnetic head. If the cut-sheet form is also held at the same time by the other contact member, the cut-sheet form can be held with a constant tension equivalent to that applied at the magnetic head, and twisting or wrinkling of the paper in the paper path can be prevented. Preferably, the pressure applied by these contact members is also independently adjustable so that the resistance between these contact members, the magnetic head, and the other opposing member can be balanced.

To assure smooth, accurate MICR code reading, presser rollers are provided on the media presser to advance while holding the cut-sheet form pressed to the detection surface positioned before the magnetic head. Note that these presser rollers may be non-driven, freely rotating rollers. To further reduce the resistance during paper transportation, the presser rollers may also be driven rollers synchronized to the other transport rollers provided in the paper path. This also helps prevent distortion of the cut-sheet form and curving of the form in the direction of travel.

These media pressers become a resistance to cut-sheet form transportation when not reading the MICR code, and can easily wear due to contact with the paper or contribute to foreign matter adhering to the magnetic head. When the presser rollers are driven in synchronization to the transport rollers, they can also contribute to magnetic head wear. To prevent this, a gap adjustment means capable of moving the media presser and/or the magnetic head is preferably provided. This gap adjustment means should, further, be capable of operating in at least two positions: a no-gap position wherein the media presser presses against the detection surface of the magnetic head during MICR code reading, and a gap position wherein there is a gap between the media presser and the detection surface of the magnetic head when the MICR code is not being read, e.g., during printing operations.

The gap adjustment means may be a means operated by a plunger or other drive mechanism, Dr may be linked to the operation of the print head. By linking operation to print head operation, the gap adjustment means can be achieved without adding additional drive or control mechanisms. For example, it is possible to move the print head widthwise to the paper path outside the available printing range at one side of the paper, and to move the media presser and/or magnetic head in conjunction with this movement.

When the media presser or magnetic head is thus moved, the gap adjustment means is preferably constituted by means of a non-magnetic member to minimize any fluctuation in the magnetic field near the detection surface of the magnetic head. A cover is also preferably provided between the paper path and the top of the magnetic head or media presser to prevent paper chaff from entering the gap opened between the magnetic head and media presser.

To further improve the MICR code recognition rate, a path member curving the paper path in the direction of paper travel may be provided as part of the paper path, and the magnetic head positioned at this curve in the path. Tension can thus be applied by this curve in the path to straighten and remove any wrinkles or creases in the cut-sheet form.

It is also necessary to reduce magnetic noise to further improve the MICR code recognition rate. Noise can occur easily when there are signals in which the intensity or polarity of the magnetic force varies, such as from the stepping motors used to drive the apparatus. Such magnetic noise can be greatly reduced by stopping all motors except those required for paper transport during MICR code reading, and can be further reduced by covering the drive motors of the transport means with a ferromagnetic shield member. This shield member may be a simple box-like member of which the corners are formed from an integral, seamless component. This is because magnetic noise leakage will increase greatly when there are gaps at the corners. By also providing a high magnetic permeability shield at a position before and opposite the detection surface of the magnetic head, or after said magnetic head, the flux density in the area around the magnetic head can be reduced, and magnetic noise can thereby be cut significantly.

The paper path should also be made as short as possible as a means of reducing the size of an integrated processing apparatus according to the present invention. The paper path can be shortened by reducing the gap between the magnetic head and the print head. By additionally using a transport means capable of advancing the cut-sheet form in either direction (forward and reverse) in the paper path, a single paper path can also be used for both the printing and MICR code reading processes. As a result, an integrated processing apparatus of the present invention can be contained more compactly.

When detecting the MICR code before printing, it is furthermore preferable to detect the MICR code while advancing the cut-sheet form in a first direction through the paper path, obtain the print start position based on the distance the cut-sheet form is advanced to complete MICR code reading, and then control cut-sheet form transportation accordingly. The cut-sheet form can therefore initially positioned to the print head based on the MICR code detection timing, and thus indexed to the print head with good precision.

During MICR code reading it is also preferable to advance the cut-sheet form after the leading edge of the form is detected by a paper detector or other means disposed at the beginning of the paper path until the leading edge reaches the magnetic head, and then press the cut-sheet form to the magnetic head so that there is no gap between the magnetic head and the media presser during MICR code reading. When reading is completed, the gap between the magnetic head and media presser is then opened.

Furthermore, when there is a form stopper moving in and out of the paper path at the entry thereto for temporarily stopping the entry of the cut-sheet form to the paper path, the magnet disposed to the paper path for remagnetizing the magnetic pattern of the cut-sheet form is preferably provided on the inside of the paper path from the form stopper, i.e., on the magnetic head side of the form stopper. Because the condition of the paper path up to the form stopper cannot be assured, this magnet is preferably placed downstream from the form stopper to accomplish reliable remagnetization. Because other magnetic cards may also be accidentally placed near the opening to the paper path, placing the magnet downstream from the form stopper also serves to prevent functional impairment of such cards.

Moreover, by placing the magnetic head facing one side of the cut-sheet forms traveling through the paper path, and placing the print head in a position enabling printing to the other side of the same cut-sheet form, an integrated processing apparatus ideally suited to processing personal checks having an MICR code imprinted on one side and the endorsement printed to the other side. Furthermore, because the direction of the MICR code and the printing direction of the endorsement are typically roughly perpendicular to each other, the MICR code reading direction and the endorsement printing direction are, in this case, preferably perpendicular to each other.

The transport distance of the cut-sheet form can also be shortened by providing the magnetic head on the cut-sheet form insertion side of the print head because MICR code reading is completed before endorsement printing.

To further achieve the above object an information detection apparatus for recording media processing according to the present invention comprises a data detection means for detecting information recorded on a recording medium while in contact with the recording medium, a presser for pressing the recording medium against the data detection means, a presser moving means for holding and setting the presser to either a pressing position at which the presser presses against the recording medium or an open position at which the presser does not press against the recording medium, and a transportation mechanism for transporting the recording medium in a first direction in which the recording medium travels from the transportation mechanism toward the data detection means, and a second direction that is opposite the first direction. With this configuration the presser is set to the open position when the recording medium is transported in the first direction, and is set to the pressing position at least while the recording medium is transported in the second direction during detection of the information recorded to the recording medium.

The above recording medium information detection apparatus further preferably comprises a printing mechanism disposed between the data detection means and the transportation mechanism for printing to the recording medium. In this case the presser is set to the pressing position when the recording medium is transported in the second direction for printing by the printing mechanism.

The invention also provides an information detection apparatus for processing recording media which have information recorded in a particular area on the surface thereof. This is accomplished by means of an insertion opening through which the recording medium is inserted to the transportation path, a transportation mechanism for transporting the recording medium inserted from the insertion opening through the transportation path in both forward and reverse directions, a printing mechanism comprising a print head for printing to the recording medium, and a reading mechanism comprising a detection means for detecting the particular information recorded to the recording medium. These means are disposed in the preceding sequence along a paper transportation path through which the recording medium is transported. In this case a presser roller is disposed to the reading mechanism such that when the recording medium is transported forward toward the reading mechanism said presser roller separates from the detection means, and the recording medium is pressed by the presser roller against the detection means, the reading mechanism reads the particular information, and the printing mechanism executes a printing process for printing to the recording medium when the recording medium is transported in the opposite direction.

It is preferable in this case for the printing process to be executed to the side of the recording medium opposite that on which the particular information is recorded. It is also preferable for the paper transportation path to be constructed so that the recording medium does not curve.

Furthermore, it is preferable for the detection means to be a magnetic head when particular information is recorded in magnetic ink. It is preferable in this case for the contact between the presser roller and recording medium to be established by a self-hold solenoid such that magnetic noise is not produced while reading the particular information.

With an information detection apparatus for recording media processing thus comprised, the recording medium is transported by the transportation mechanism through the paper transportation path along which are disposed in sequence from the insertion opening the transportation mechanism, printing mechanism, and reading mechanism to position the recording medium between the detection means and presser roller of the reading mechanism. The presser roller is then operated to press the recording medium against the detection means while the recording medium is pulled by the transportation mechanism to straighten wrinkles and sagging in the recording medium at the same time the information recorded on the recording medium is read and a printing process is executed. Reading errors and printing errors can thus be reduced.

This operation also makes it possible to execute the printing process according to the information read from the recording medium, thereby enabling a process including plural steps, such as validation checking and endorsement printing dependent upon the validation result, to be completed with a single sequence of operations for a particular recording medium such as a check or negotiable instrument.

After the printing process is completed the recording medium is ejected from the insertion opening. The insertion opening and ejection position are thus the same, thereby facilitating operation and enabling another piece of office equipment to be placed in the space above the information detection apparatus for recording media processing.

The recording media processed by this type of recording medium information detection apparatus are commonly checks and other types of negotiable instruments. Endorsement printing can therefore be accomplished by arranging the printing mechanism to print on the side of the recording medium opposite that to which the particular information read by the reading mechanism is recorded.

Furthermore, if the paper transportation path is arranged in a straight line so that the recording medium does not curve, the component mechanisms can be disposed in close proximity. This makes it possible to process checks and other similarly small negotiable instruments, and reduces the potential for paper jams.

The particular information read by the reading mechanism from checks and other types of negotiable instruments is also commonly recorded using magnetic ink. This makes it possible to use a magnetic head as the detection means. If contact between the presser roller and recording medium is established by a self-hold solenoid in this case, it is only necessary to supply current to the self-hold solenoid when it is necessary to move the presser roller. The current flow can therefore be stopped when the presser roller is held pressed to the detection means, thereby preventing magnetic noise when reading the information recorded with magnetic ink.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIGS. 8(a)–8(c) are used to describe the operation of the media presser shown in FIGS. 6 and 7 by means of print head movement;

DESCRIPTION OF THE PREFERRED EMBODIMENTS

The preferred embodiment of the present invention is described below with reference to the accompanying figures.

First Embodiment

The preferred embodiments of an integrated processing apparatus according to the present invention are described hereinbelow based on a printing apparatus. The printing apparatus on which an integrated processing apparatus of the invention is based is capable of housing two rolls of printer paper for journal and receipt printing, respectively, and enables a cut-sheet form (slip form) to be inserted from below the main unit for printing. Printing apparatuses of this type are commonly used in POS stations, and can be found in retail stores, hotels, and other business establishments.

Overall Structure

Figure 1:
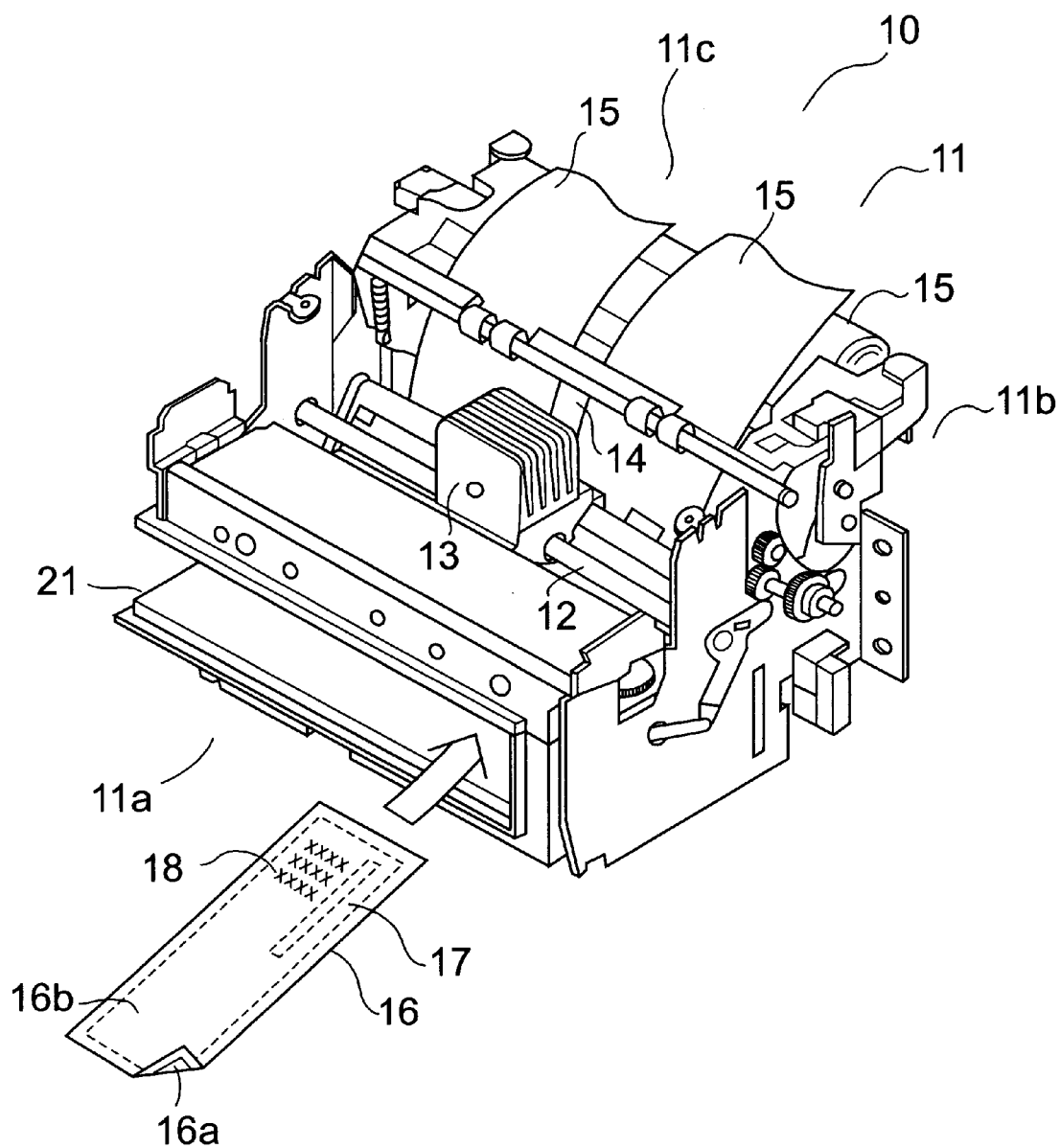
FIG. 1 is an overview showing an integrated processing apparatus according to the first embodiment of the present invention based on a printer.

An overview of an integrated processing apparatus according to the present invention based on a printing apparatus is shown in FIG. 1. An integrated processing apparatus of the invention is referred to simply as a printer below. Referring to FIG. 1, the printer 10 of the present invention accomplishes journal printing, receipt printing, and slip printing by moving print head 13 along guide shaft 12 extending from side to side in main housing 11. Print head 13 is typically a wire dot head whereby printing is accomplished by driving the dot wires in print head 13 against platen 14 to print on roll paper 15 or cut-sheet form 16. Print head 13 is moved by a print head drive means using a timing belt or stepping motor, and travels side to side across platen 14 to print at a specified position on roll paper 15 or cut-sheet form 16.

Roll paper 15 or cut-sheet form 16 is advanced by a paper feed mechanism comprising a group of feed rollers or stepping motor(s) as described below in a direction perpendicular to the direction of print head movement. Roll paper 15 is set in the back 11*b* of main housing 11, and is guided between platen 14 and print head 13 to the top 11*c* of main housing 11. Note that the printer 10 of the present invention can accommodate two rolls of paper 15, enabling both journal printing for store records and receipt printing for customer receipts.

The printer 10 of the present invention is also equipped to process cut-sheet forms 16, including personal checks to which an MICR code is imprinted. The cut5 sheet form 16 is inserted from paper insertion opening 21 provided at the front 11*a* of main housing 11, guided through the paper path, which is described below, between print head 13 and platen 14 for MICR code reading and then printing, and then ejected from top 11*c* of the printer after printing is completed.

Note that personal check 16 is hereafter used as the cut-sheet form for explanation only. As described above, the account number of the user, a serial tracking number, routing codes, and other information is imprinted to one side 16*a* of personal check 16 using MICR code 17. The character shape and print quality of the MICR code are standardized, as is the printing position on the check. It is therefore possible to output from the magnetic head a signal corresponding to the MICR code by scanning this known region of the personal check with the magnetic head, and the MICR code printed to the check can be recognized by analyzing the output waveform. Note that before the check is scanned by the magnetic head, the magnet is directed to the area to which the MICR code is printed to remagnetize the ink and enable recognition.

The payment amount and the signature of the payer (the person writing the check) are also recorded to the one side 16*a* of personal check 16. Personal check 16 is endorsed by printing the date, time, store name, amount, and/or other information (endorsement data 18) to the second side 16*b* of the check. When the cashier receives a personal check, the validity of the check is first confirmed by scanning the MICR code data, and valid checks are then endorsed as described in the above.

With the printer 10 shown in FIG. 1, personal check 16 is inserted with second side 16*b* facing up to enable endorsement printing 18 by print head 13. It follows that personal check 16 is inserted with the side to which MICR code 17 is imprinted face down. Because the print position of the MICR code is standardized and is referenced to the bottom edge of the personal check, the personal check is inserted to the printer 10 shown in FIG. 1, facing down with the bottom of the personal check to the right side of the paper insertion opening 21. In a printer of an embodiment of the present invention shown in FIG. 1, the home position for printing is defined relative to the right side end of the paper path and the front surface of form stopper 25, i.e. cut sheet setting position 26 in FIG. 3, thus performing printing on a personal check in succession to MICR reading without ejection therebetween. In the printer of the present invention, the right end of a paper path is defined as the common reference position for both printing and MICR reading. When an operator sets a form to the printer with its right edge abutted to the common paper guide, printing can be performed on the right place of the form. Further, if the form is a personal check with MICR code recorded, MICR reading can be performed successfully because the distance between the magnetic head and the common paper guide is exactly the same as one between MICR codes and the right side edge, namely the bottom of personal checks.

Figure 2:
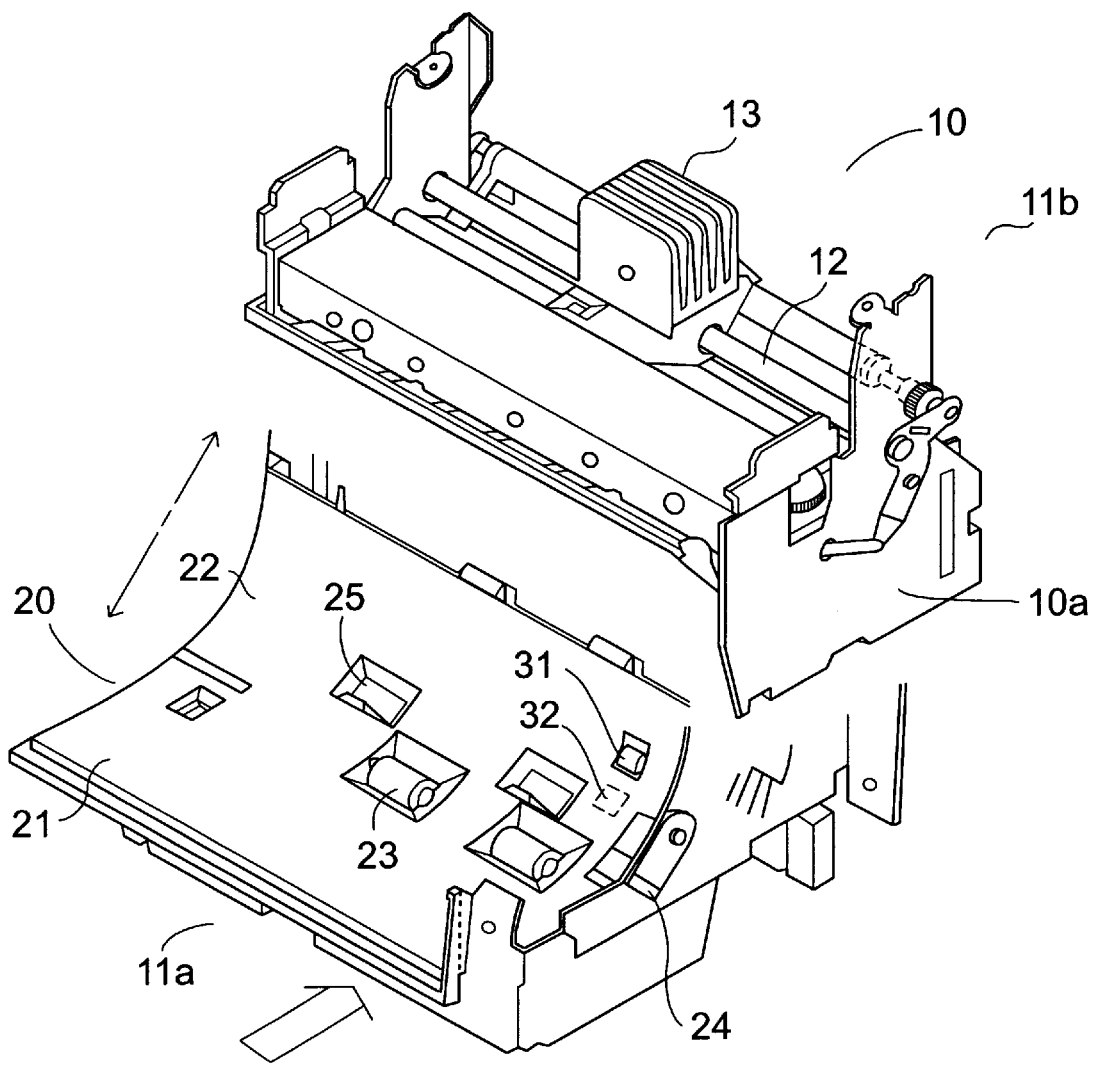
FIG. 2 is a disassembled view of an integrated processing apparatus shown in FIG. 1 providing a view of the magnetic head disposed to the paper path.

FIG. 2 is an overview of printer 10 with printer unit 10*a*, including print head 13. The arrangement of the essential components of paper path 20 through which the cut-sheet forms, i.e., personal checks, are transported is described below with reference to FIG. 2. This paper path 20 directs the forms from the bottom paper insertion opening 21 to which the forms are inserted to print head 13 at top. The bottom surface of paper path 20 therefore has a gentle upward-curving slope 22. Disposed along slope 22 in sequence from paper insertion opening 21 are: cut-sheet form loading roller 23, paper detector 24, form stopper 25, magnet 32 for remagnetizing the MICR code, and magnetic head 31 for detecting the MICR code.

Note that magnet 32 and magnetic head 31 for MICR code reading are disposed to the right side of slope 22. As a result, when a personal check is inserted to the printer 10 of the present embodiment with the MICR code correctly aligned to the right side of paper insertion opening 21, the MICR code passes over the magnet 32 and magnetic head 31 as the check is advanced through the paper path.

Because personal checks and other cut-sheet forms (slip forms) are always inserted aligned to the right side of the paper path, the paper detector 24 is positioned where it can detect the top right corner of the form inserted to paper insertion opening 21 in the direction of the arrow in FIG. 2.

Paper path

Figure 3:
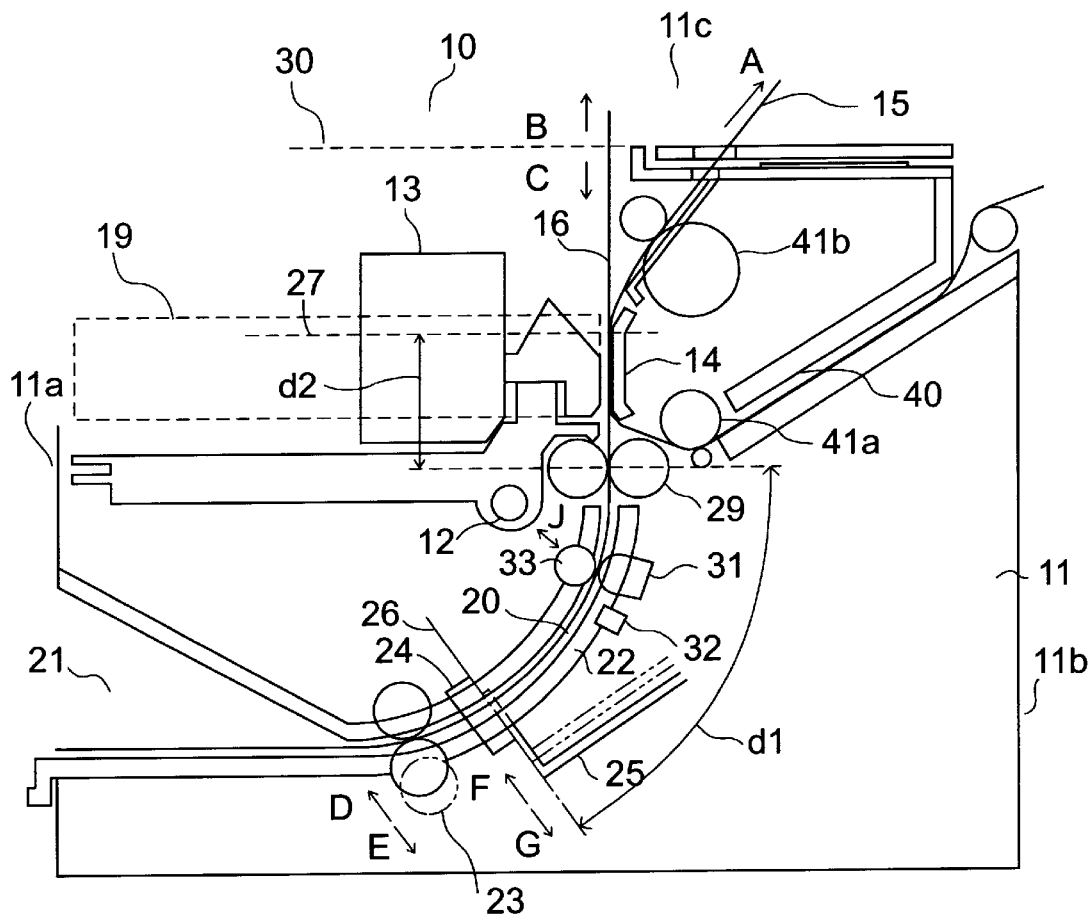
FIG. 3 is a cross section of an integrated processing apparatus shown in FIG. 1.

FIG. 3 is a side cross section showing the paper path of the printer 10 of the present embodiment. Roll paper 15 passes through roll paper path 40, held by roll paper transportation rollers 41*a*, 41*b*, and advanced thereby in the direction of arrow A. Roll paper 15 is thus guided through roll paper path 40 between platen 14 and print head 13, which can thus print to the roll paper. Roll paper transportation rollers 41*a*, 41*b* are typically driven by a stepping motor, the drive power of which is transferred to roll paper transportation rollers 41*a*, 41*b* by gears or some other roll paper transportation drive power transfer means (not shown in the figures).

Personal checks and other cut-sheet forms can be inserted through paper path 20 to between platen 14 and print head 13. Personal check 16 is similarly held by cut-sheet form transportation roller 29 and cut-sheet form loading roller 23, and can be transported thereby in both forward and reverse directions (directions indicated by arrows B and C in FIG. 3). Transportation roller 29 and loading roller 23 are also driven by a stepping motor 45 as described below.

Stepping motor 45 is also used to drive roll paper transportation rollers 41*a*, 41*b*. The stepping motor used as the drive source for paper transportation is therefore connected to the drive power transfer mechanism for advancing the roll paper, and to the drive power transfer mechanism for advancing cut-sheet form, through a drive power transfer system switching mechanism comprising plungers, for example. The drive power from a single stepping motor can therefore be transferred to either of the power transfer mechanisms as needed.

Personal check 16 is not normally preloaded to the printer, but is inserted to paper insertion opening 21 for loading when printing is required. The operation of this loading mechanism is described in detail below following the normal sequence executed to load personal check 16.

When the operator inserts personal check 16 to form stopper 25, the right side of the leading edge of personal check 16 is detected by cut-sheet form paper detector 24, which accordingly outputs a corresponding "paper detected" signal. A photo-sensor is used in this embodiment as cut-sheet form paper detector 24.

The position of the right side leading edge of personal check 16, i.e., the position of the form stopper, is referred to below as cut-sheet form insertion position 26. From this position, form stopper 25 is retracted outside cut-sheet form paper path 20, personal check 16 is held by cut-sheet form loading rollers 23, and is advanced the distance d1 from cut-sheet form insertion position 26 to cut-sheet form transportation rollers 29. Personal check 16 is then advanced distance d2 from cut-sheet form transportation rollers 29 to cut-sheet form print start position 27 by means of cut-sheet, form transportation rollers 29 and loading rollers 23. Printing to personal check 16 is enabled at this point.

At least one of cut-sheet form loading rollers 23 is movable in the directions of arrows D and E by means of a loading roller closing mechanism comprising a plunger or other means and not shown in the figures. The operation of form stopper 25 is linked to the operation of cut-sheet form loading rollers 23 such that form stopper 25 also moves in the directions of arrows G and F in conjunction with the movement of loading roller 23 in the directions D and E, respectively. More specifically, when the loading roller closing mechanism is open, i.e., when personal check 16 is not held by cut-sheet form loading rollers 23, one cut-sheet form loading roller 23 is moved in the direction of arrow E and form stopper 25 is simultaneously moved in the direction of arrow F, thereby closing paper path 20.

Conversely, when the loading roller closing mechanism is closed, i.e., when personal check 16 is held by cut-sheet form loading rollers 23, one cut-sheet form loading roller 23 is moved in the direction of arrow D and form stopper 25 is simultaneously retracted from paper path 20 in the direction of arrow G. When personal check 16 is loaded from cut-sheet form insertion position 26 in the direction of arrow B to cut-sheet form print start position 27, and when reversed in the direction of arrow C, the loading roller closing mechanism is closed. Thus when the loading roller closing mechanism is closed, cut-sheet form loading roller 23 is moved in the direction of arrow D to hold and transport personal check 16.

When personal check 16 is present at the point to which form stopper 25 enters the paper path, the loading roller closing mechanism is open with form stopper 25 raised in the direction of arrow F into the cut-sheet form paper path. When thus raised, form stopper 25 also presses against personal check 16 in cut-sheet form paper path 20. Form stopper 25, however, serves to obstruct the paper path when cut-sheet form insertion is inappropriate, and is therefore pressed in the direction of arrow F by means of a weak spring. The force of form stopper 25 against personal check 16 inside paper path 20 when the loading roller closing mechanism is open is therefore sufficiently weak, and does not hinder transportation of personal check 16.

MICR code reading magnetic head 31 is also disposed to cut-sheet form paper path 20 such that the magnetic ink code passes over magnetic head 31 when a personal check 13 is fed through cut-sheet form paper path 20. Magnet 32 is disposed at a position exposed to cut-sheet form paper path 20 to remagnetize the magnetic ink of the MICR code before the MICR code reaches magnetic head 31.

As personal check 16 is transported through paper path 20 by cut-sheet form loading rollers 23, the check first passes magnet 32, and the magnetic ink of the MICR code imprinted to the check surface is thereby magnetized. Personal check 16 then passes magnetic head 31, which is disposed to slope 22 at a position facing the surface of personal check 16, and detects the MICR code.

The printer of the present embodiment also comprises media presser 33, which projects into paper path 20 from the side thereof opposite magnetic head 31. As a result, when personal check 16 passes magnetic head 31, media presser 33 holds the surface of personal check 16 firmly against magnetic head 31 to enable error-free MICR code detection. Media presser 33 is also able to move in the direction of arrow J in this embodiment, and thereby presses personal check 16 against magnetic head 31 during MICR code reading, but is separated from magnetic head 31 at all other times to eliminate resistance to personal check 16 transportation.

Media presser 33 and the drive mechanism therefor are described in further detail below.

Drive mechanism

FIG. 4(*a*) is a side cross section of the mechanism of the printer of the present embodiment for transporting cut-sheet forms, and FIG. 4(*b*) is a rear cross section view of the same.

Transportation of personal check 16 inserted to paper path 20 is driven by paper feed stepping motor 45, which is disposed at back 11*b* of printer 10. Drive gear 44 is driven by stepping motor 45, and drives gear set 46 to operate cut-sheet form transportation rollers 29 located in paper path 20 near platen 14. Cut-sheet form transportation rollers 29 and loading rollers 23, and cut-sheet form transportation rollers 29 and presser roller 34 (which forms media presser 33), are respectively connected by transportation belts 47 and 48. As a result, cut-sheet form loading rollers 23 and presser roller 34 start and stop synchronized to cut-sheet form transportation rollers 29, and operate at an equal paper transportation speed. As a result, personal check 16 inside paper path 20 is transported at the same speed whether it is transported by cut-sheet form loading rollers 23 alone, or by cut-sheet form loading rollers 23, cut-sheet form transportation rollers 29, and presser roller 34.

As shown in FIG. 4(*b*), stepping motor 45 of the present embodiment is protected by shield 52 on the sides and bottom. Shield 52 is made from a ferromagnetic or high magnetic permeability material such as permalloy, ferrite, or iron as a means of suppressing magnetic leakage from stepping motor 45. Shield 51, similarly made from a ferromagnetic or high magnetic permeability material, is provided on the same side as media presser 33 opposite magnetic head 31. By providing this shield 51, noise flux from external sources can be focused on the shield, and the flux density in front of magnetic head 31 resulting from external fields is reduced. Magnetic noise leaking from stepping motor 45 and other sources is thus suppressed by shield 51.

Figure 5A:
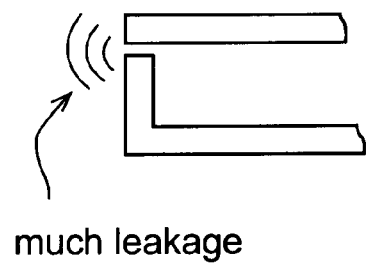
FIGS. 5(a) and 5(b) are used for a comparison of the structure of the motor shield.
Figure 5B:
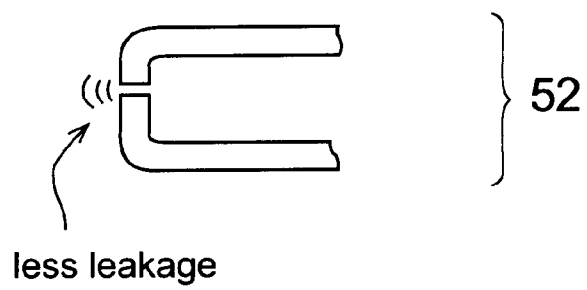

The box-like shield 52 covering stepping motor 45 is formed by shaping a high magnetic permeability sheet or ferromagnetic sheet material. The corners of the box are shaped as shown in FIG. 5(*b*) to prevent magnetic leakage. When there is a gap at the corners of the shield, excessive magnetic noise can escape from the inside the shield. By forming seamless corners permitting no gap, however, there will be minimal magnetic noise leakage even if there are seams or through-holes for the motor shaft on the flat members of the shield. This latter case is the result of the saturation flux characteristics of the cross sections of the two materials forming the gap being equal.

It is to be noted that shield 52 is constituted as shown in FIG. 5(*b*) to prevent the effects of magnetic noise leakage.

The printer of the present embodiment is also able to vary the speed of the 10 stepping motor driving the rollers. A single stepping motor can therefore be used to achieve both the mechanism for advancing checks for MICR code reading, and the mechanism for advancing checks for printing. A paper transportation speed of approximately 70–90 mm/sec is desirable for printing because faster paper transportation speeds can result in a shifting print position and poor print quality, and the mechanism required to achieve a high precision stopping position is expensive.

A paper transportation speed of approximately 100 mm/sec or greater is desirable for MICR code reading, though the actual speed is also dependent upon the MICR code format and the magnetic head detection characteristics. This transportation speed is the speed used in currently available MICR code analyzers to obtain the required recognition rate during interpretation of the signal output by the magnetic head.

As a result, the printer of the present embodiment can transport the personal checks at the speed most appropriate to the executing function by simply varying the speed of the stepping motor. It is to be noted that means other than varying the speed of the stepping motor can also be used, including a means of changing the reduction ratio by changing the gear set used for transportation during MICR code reading, and the gear set used for transportation during check printing.

Note, further, that stepping motor 45 is also controlled to operate at a predetermined speed in two directions. More specifically, the printer 10 of the present embodiment can move personal check 16 in the directions of both arrows B and C as shown in FIG. 3 by means of cut-sheet form loading rollers 23 and transportation rollers 29. By thus enabling personal check 16 to be transported through the paper path in either direction, MICR code reading can be performed when the check is advanced in on direction, and printing can be performed when the check is advanced in the other direction. A single paper path can thus be used for two processes, and the total paper path length can be reduced. Even when printing and MICR code reading are accomplished while moving the check in the same direction, the same paper path can be used for both processes by back-feeding the check between MICR code reading and printing. By thus advancing the check in two directions, the size of the apparatus combining these two functions can also be reduced.

Note, further, that magnetic head 31 is disposed to paper path 20 between cut-sheet form loading rollers 23 and cut-sheet form transportation rollers 29 in the printer of the present embodiment. As a result, when personal check 16 passing through paper path 20 passes magnetic head 31, personal check 16 is held by one and/or both of these two roller sets, cut-sheet form loading rollers 23 and cut-sheet form transportation rollers 29. Furthermore, because cut-sheet form loading rollers 23 and cut-sheet form transportation rollers 29 are synchronously driven, personal check 16 can be held and transported at a consistent, stable speed by said rollers 23 and 29. Therefore, even if there is some resistance in the paper path, the speed of the cut-sheet form passing magnetic head 31 will be stable, and the MICR code can be read with high precision.

If magnetic head 31 is provided between these rollers 23 and 29, magnetic head 31 will be on the paper insertion opening 21 side of paper path 20 relative to print head 13. As a result, the validity of personal check 16 can be confirmed by scanning the MICR code, and endorsement printing can be executed after the check is determined valid. Processing personal checks is thus more efficient with an integrated processing apparatus of the present embodiment because magnetic head 31 and print head 13 are arrayed in the sequence of normal check processing.

If magnetic head 31 is on the paper insertion opening 21 side of the print head 13, magnet 32 for magnetizing the MICR code is also on the paper insertion opening 21 side of magnetic head 31. More specifically, magnetic head 31 is in the printer of the present embodiment positioned in the paper path 20 on the magnetic head 31 side of form stopper 25, i.e., in paper path 20 between form stopper 25 and magnetic head 31. This is because the area outside form stopper 25 is the area to which the check is, set by the operator, and the path through which the check passes is not constant. It therefore follows that if the magnet 32 is placed outside of form stopper 25, the MICR code may not be properly magnetized, and the MICR code cannot be recognized with good precision. However, by placing magnet 32 inside from form stopper 25, the MICR code imprinted to personal check 16 will reliably pass magnet 32, and can therefore be reliably read.

Note, also that paper insertion opening 21 to the paper path is open with a relatively wide angle to facilitate inserting personal check 16, and this area may also be used by the operator to place credit cards or other objects. If magnet 32 is provided inside from form stopper 25 as described in the present embodiment, the data recorded to the magnetic strip of the credit card cannot be damaged by magnet 32 because form stopper 25 stops accidental entry of the credit card to the paper path.

For magnetic head 31 to read the MICR code with high precision, it is essential to minimize any magnetic noise, one source of which is the variable intensity and polarity field leaking from the stepping motor. To minimize as many possible sources of magnetic noise as possible, all motors other than the stepping motor 45 transporting personal check 16 are stopped by the printer of the present embodiment during MICR code reading. The sides and bottom of stepping motor 45 are also covered by Shield 52 to reduce magnetic noise leakage.

Magnetic head 31 is also covered by shield 53, and shield 51 is provided in front of magnetic head 31. As a result, a low magnetic flux density space is created by magnetic shields 51 and 53 around magnetic head 31, the effects of magnetic noise are minimized even when magnetic noise is conducted along the motor shaft or passes the shields, and stable, high precision MICR code reading can be accomplished.

To further increase the MICR code recognition rate, the area to which the MICR code is imprinted should preferably be held tight to the magnetic head because the gap between the magnetic head and the MICR code will vary if the inserted check has been folded or wrinkled. By providing media presser 33 opposite the magnetic head 31 in the printer according to the present embodiment, however, the area to which the MICR code is imprinted is held tight to the magnetic head 31.

This media presser mechanism is described in detail below.

Figure 6A:
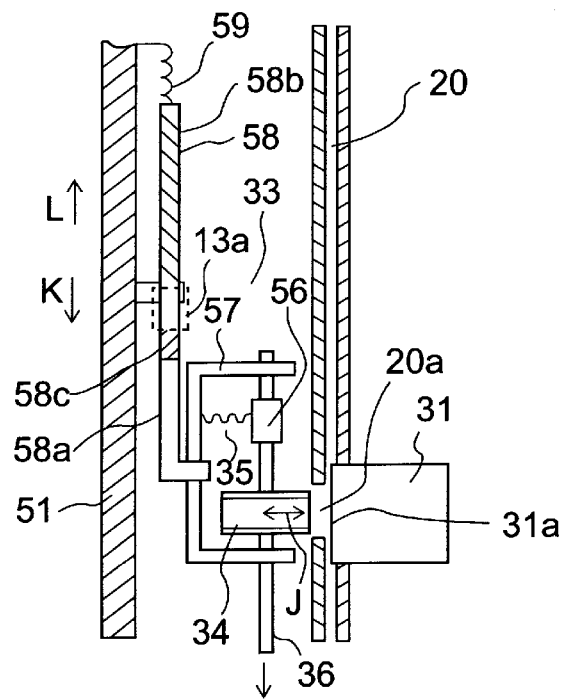
FIG. 6(a) is a top view.
Figure 6B:
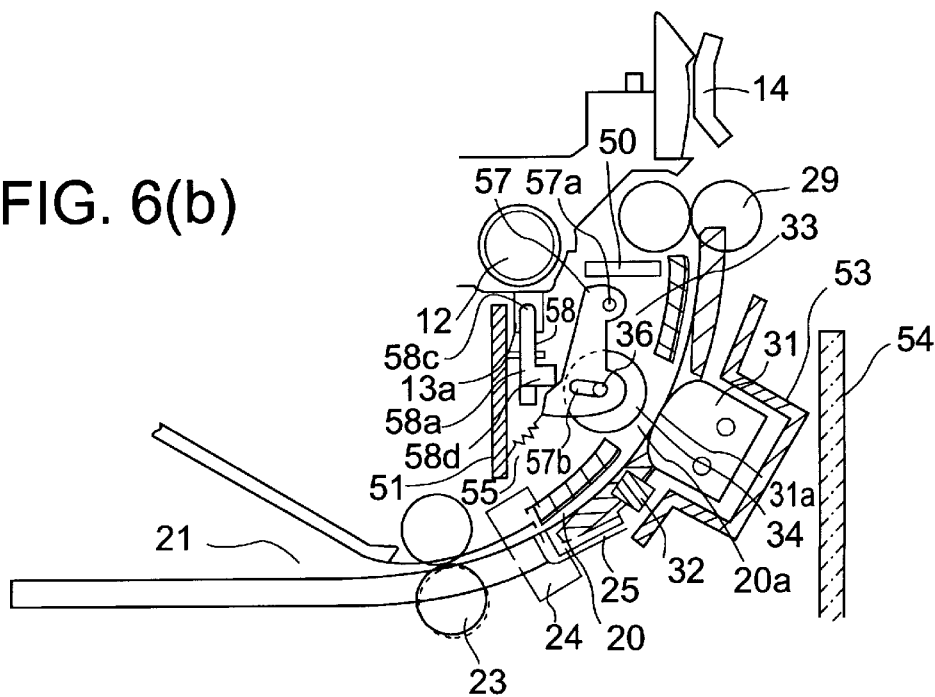
FIG. 6(b) is a side cross section of an enlarged view of the area around the magnetic head of an integrated processing apparatus shown in FIG. 1 with the media presser separated from the magnetic head.
Figure 7A:
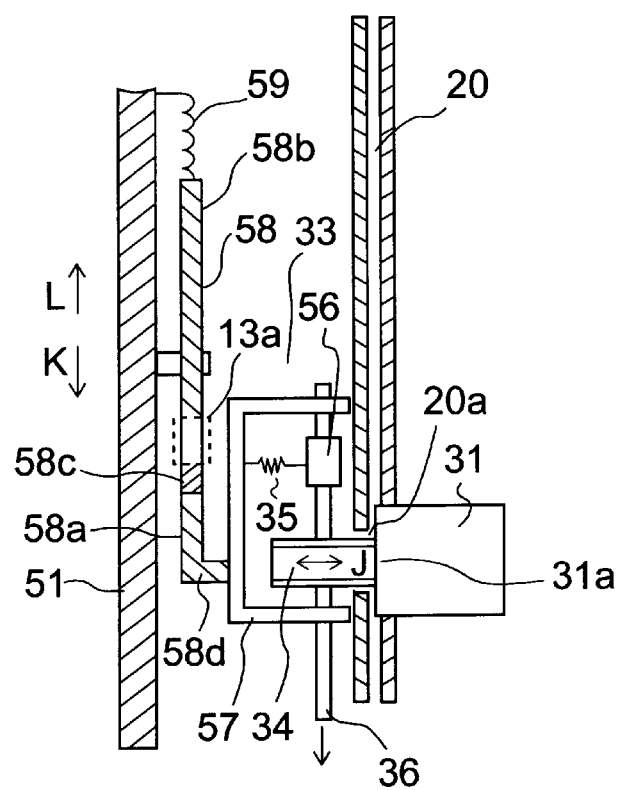
FIG. 7(a) is a top view.
Figure 7B:
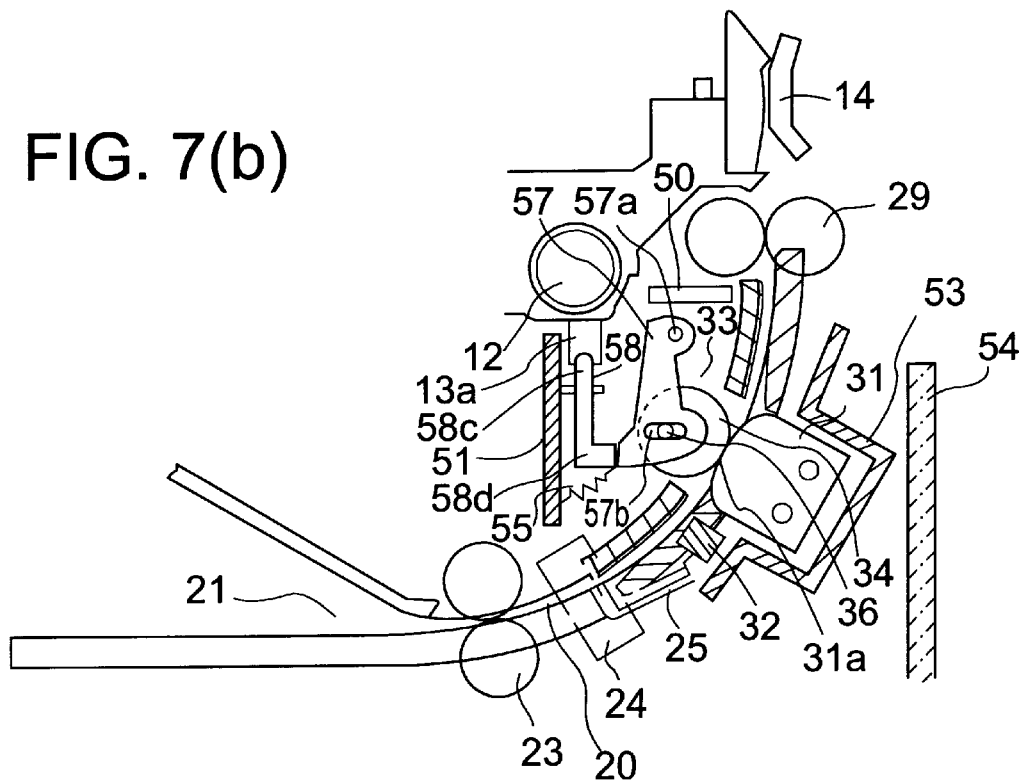
FIG. 7(b) is a side cross section of an enlarged view of the area around the magnetic head of an integrated processing apparatus shown in FIG. 1 with the media presser pressed to the magnetic head.

Media presser mechanism The area around magnetic head 31 is shown enlarged in FIGS. 6(a), 6(b), 7(a) and 7(b). FIGS. 6(a) and 6(b) shows the state wherein media presser 33 is separated from detection surface 31a of magnetic head 31, and there is a gap between media 30 presser 33 and detection surface 31a. FIGS. 7(a) and 7(b) shows the state in which media presser 33 is closed to detection surface 31a, and there is therefore no gap therebetween. Note, also, that FIG. 6(a) and FIG. 7(a) are cross sections showing the area around magnetic head 31 as viewed from above the printer along paper path 20, and FIG. 6(b) and FIG. 7(b) are cross sections from the side of the printer perpendicular to paper path 20.

Figures 4A, 4B:
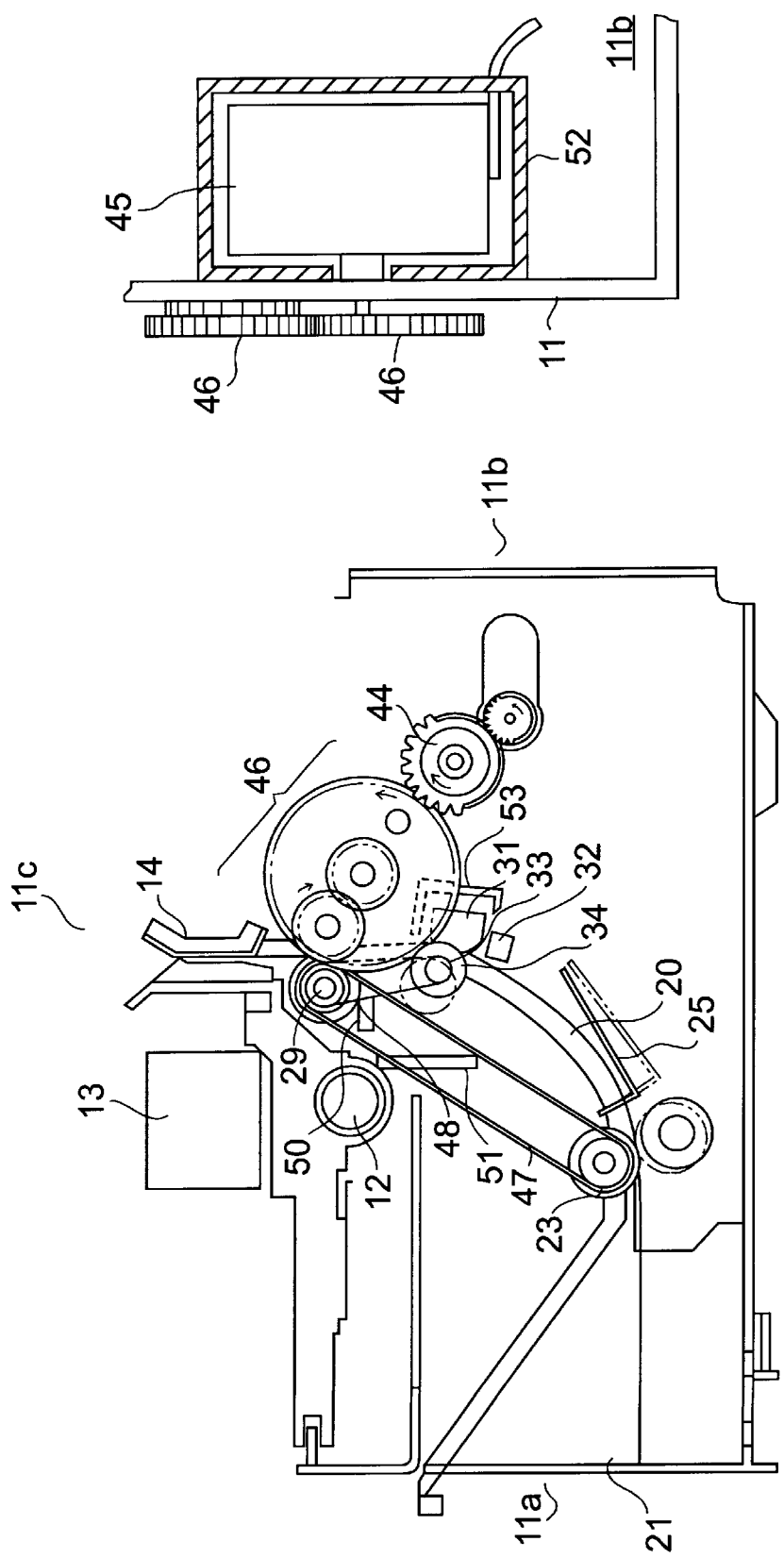
FIG. 4(a) is a cross section.
FIG. 4(b) is a side view, of primarily the drive system of an integrated processing apparatus shown in FIG. 1.

As shown in FIGS. 4(a) and 4(b), media presser 33 of the present embodiment comprises a presser roller 34, which is driven synchronized to cut-sheet form transportation rollers 29. Presser roller 34 presses the check against magnetic head 31 so that the area to which the MICR code is imprinted is pressed against magnetic head 31. Presser roller 34 is positioned opposite to detection surface 31a, which is the front face of magnetic head 31, connected by shaft 36 to belt 47 (FIGS. 4(a) and 4(b)), and driven in synchronization with the transportation rollers.

Shaft 36 is mounted to lift lever 57, and a torsion coil spring 35 is provided pushing shaft 36 away from lift lever 57 in the direction of magnetic head 31. A plastic sleeve 56 is provided on shaft 36 at the point contacted by the end of torsion coil spring 35, and shaft 36 is dependably pushed by torsion coil spring 35. Sleeve 56 also prevents direct contact between torsion coil spring 35 and shaft 36, thereby reducing wear on both and preventing trouble resulting from damage to the spring or shaft.

The lift lever 57 that is part of media presser 33 is connected to the printer frame enabling lift lever 57 to rotate freely around a single point 57a at the top of lift lever 57. The bottom of lift lever 57 is connected to the printer frame by means of spring 55 connected to shield 51. Thus, when the back of lift lever 57 is pressed by switching lever 58 from the side opposite presser roller 34, lift lever 57 rotates against spring 55, and presser roller 34 is moved in the direction of arrow J through window 20a provided in paper path 20. As result, presser roller 34 projects into the paper path, and the check in the paper path is pressed against detection surface 31a of the magnetic head.

The hole 57b of lift lever 57 in which shaft 36 is mounted is an oval hole to permit movement of shaft 36, and can thus absorb any error in the installation angle of detection surface 31a. Specifically, the tension of torsion coil spring 35 presses presser roller 34 against the check, and the check against the detection surface 31a, and shaft 36 moves inside hole 57b to assure tight contact between these components.

Switching lever 58 comprises two arms 58a and 58b extending on both sides thereof, and is mounted to shield 51 such that the axis of rotation of switching lever 58 is approximately the center of the lever. A plan view and the operation of switching lever 58 are shown in FIGS. 8(a)–8(c). Note that switching lever 58 is installed to shield 51 provided opposite magnetic head 31 in this embodiment, but may also be installed to the printer frame.

The end of one arm 58a extends in the direction of magnetic head 31 to press the back of lift lever 57, and the other arm 58b is pulled by spring 59 toward shield 51. Switching lever 58 also comprises operating arm 58c contacting projection 13a extending from the bottom of print head 13 above. As a result, when print head 13 moves in the direction of arrow K, projection 13a contacts operating arm 58c, rotates switching lever 58, and presses the back of lift lever 57 by means of angle 58d on the end of switching lever 58. As a result, lift lever 57 rotates toward paper path 20 against spring 55 as shown in FIGS. 7(a) and 7(b), and presser roller 34 is forced against magnetic head detection surface 31a. When print head 13 moves in the direction of arrow L, switching lever 58 is returned to the open position by spring 59, and lift lever 57 is returned to the position shown in FIGS. 6(a) and 6(b) by spring 55. As a result, presser roller 34 is retracted from paper path 20, and a gap is opened between presser roller 34 and magnetic head detection surface 31a. Note that operation of switching lever 58 is dependent upon the direction of print head 13 movement, and the movement position of print head 13 at which switching lever 58 operates is set outside the normal printing area. As a result, print head 13 moves to this area and switching lever 58 is operated only during MICR code reading.

A cover 50 is also provided above presser roller 34 in the printer of the present embodiment to close the gap between presser roller 34 and paper path 20 and prevent paper chaff or other dust and foreign matter from entering the paper path and clinging to presser roller 34. More specifically, because there are times when presser roller 34 is operated and there is a gap between presser roller 34 and magnetic head 31, cover 50 is provided to prevent paper chaff or other dust and foreign matter from entering this gap and soiling or obstructing the detection surface of magnetic head 31. Cover 50 thereby helps assure reliable presser roller 34 operation, and dependable MICR code reading.

The operation of magnetic head 31 and switching lever 58 is described in detail below with reference to FIGS. 8(a)–8(c), a view of switching lever 58 installed to shield 51 from the magnetic head side thereof. As shown in FIG. 8(a), print head 13 normally moves through the printing range (arrow W) widthwise to the paper path. When a personal check is placed in the printer for MICR code reading, print head 13 is moved by the timing belt outside the printing range W to the edge of the paper path in the direction of arrow K. As shown in FIG. 8(b), projection 13a from the bottom of print head 13 contacts operating arm 58c of switching lever 58 as print head 13 moves. As print head 13 continues to move to the edge of the paper path, the movement of print head 13 causes switching lever 58 to rotate as shown in FIG. 8(c), and arm 58a, on the end of which is angle 58d, descends. As a result, lift lever 57 pushes angle 58d as shown in FIGS. 7(a) and 7(b), and presser roller 34 is pressed to magnetic head 31.

When MICR code reading is completed, print head 13 moves in the direction of arrow L, and thus returns to the printing range W. Switching lever 58 is thus re-rotated to the original position by spring 59, and angle 58d rotates up. As a result, lift lever 57 also returns to the original position, and presser roller 34 is separated from magnetic head 31. By setting the tension of spring 59 relatively weak, the load acting on print head 13 is also reduced when switching lever 58 accomplishes the media presser opening/closing operation. However, if spring 59 is weak, switching lever 58 may not return with the force of spring 59 alone because of the repeated wear on the spring during switching lever 58 and lift lever 57 operation. To resolve this, switching lever 58 further comprises a slight projection 58e toward the print head on the arm 58b end of switching lever 58 as shown in FIGS. 8(a)–8(c). Thus, when print head 13 returns to the normal position, projection 13a contacts projection 58e and assists the return of switching lever 58. This projection 58e is constituted to not contact projection 13a when print head 13 travels through the printing range W. As a result, projection 58e does not interfere with projection 13a of print head 13 when print head 13 travels through the normal printing range W, and printing can thus proceed smoothly.

As previously described, magnetic noise is preferably reduced during MICR code reading. The magnetic conditions around print head 13 should preferably also not change to enable stable MICR code reading. The means used to operate presser roller 34 in the present embodiment, i.e., lift lever 57 and switching lever 58, is therefore preferably made from a non-magnetic stainless steel member, and the axle of presser roller 34 is preferably brass to reduce wear. It is to be noted, however, that the present invention shall not be limited to these materials, and any non-magnetic material, including aluminum, may be used.

The printer of the present embodiment reduces resistance to personal check transportation, and thereby prevents checks from meandering or jamming and enables reliable MICR code reading, by driving presser roller 34 pressing the personal check to the magnetic head synchronized to cut-sheet form loading rollers 23 and cut-sheet form transportation rollers 29. Because the check is then pressed against magnetic head 31 by the presser roller only during MICR code reading, the amount of time the check is pressed against the detection surface of the magnetic head can be minimized, wear and soiling of the magnetic head and media presser can thus be prevented, and reliable MICR code reading can be accomplished.

Problems resulting in damage to or soiling of the check or the cut-sheet form can also be prevented. Particularly when presser roller operation is synchronized to transportation roller operation as in the present embodiment, idle rotation of the presser roller while in contact with the detection surface of the magnetic head can e prevented by adjusting the gap between the presser roller and magnetic head.

Moreover, movement of presser roller 34 is linked to movement of print head 13 in the present embodiment. It is therefore not necessary to provide a separate power source to operate presser roller 34, and the installation space and power consumption of this extra power source can be eliminated. For example, if the force generated by spring 59 is weak enough to allow holding the pressing state by the friction force generated by the contact between angle 58d and lift lever 57, the holding power can be reduced compared to, for example, a plunger, thus reducing power consumption. The present embodiment is therefore suited to the compact, integrated printing apparatuses used, for example, in POS stations. This configuration also makes it possible to eliminate additional control circuitry for the presser roller 34 because the required control can be achieved by slightly modifying the control of print head 13. It will be obvious that a plunger or other power source separate from that required for the print head can also be used to achieve the above function. It is also possible to move the magnetic head 31 side of the mechanism rather than the media presser, or to move both the media presser and the magnetic head. In addition, cut-sheet forms can be consistently advanced by synchronizing presser roller 34 with the other transportation rollers, and distortion and jams in the paper feed direction when the form is pressed to the magnetic head 31 can be prevented.

Figure 9A:
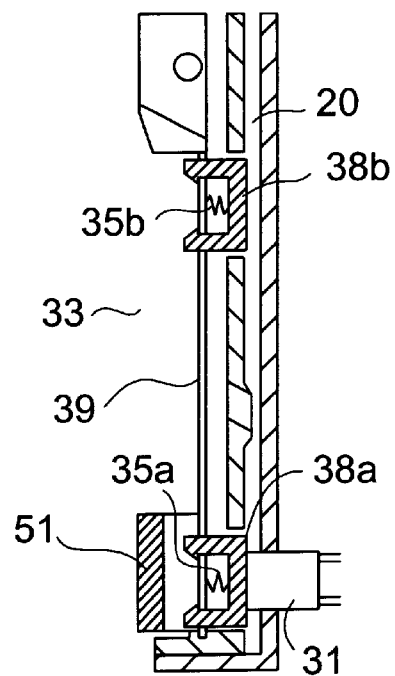
FIG. 9(a) is a top cross section.
Figure 9B:
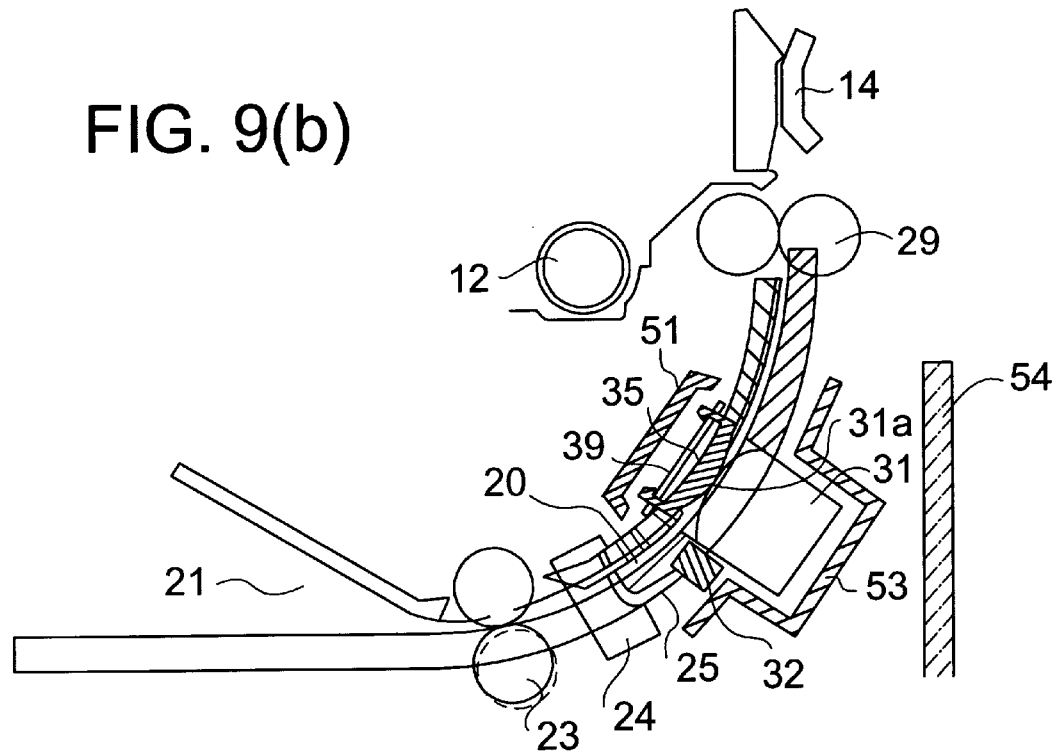
FIG. 9(b) is a side cross section, of the enlarged area around the magnetic head in an integrated processing apparatus according to an alternative embodiment of the present invention.

An alternative embodiment of the media presser 33 of the present invention is shown in FIGS. 9(a) and 9(b). In this embodiment media presser 33 comprises support member 39 installed at one side of paper path 20 and extending to a position opposite magnetic head 31, and pads 38a and 38b at a position opposite magnetic head 31 and at a position where the end of the check can be held. The pressure applied by these pads 38a and 38b can be balanced by adjusting corresponding springs 35a and 35b. High precision MICR code reading is also possible with the media presser 33 of the present embodiment because the pads 38a and 38b press the check to magnetic head 31. Furthermore, because both the end passing the magnetic head 31 and the other end of personal check 16 are firmly held by the two pads 38a and 38b in separated positions, substantially equal resistance is applied to both ends of the check. The check is therefore held with balanced tension as it passes the magnetic head 31, and the orientation of the check in the paper path 20 will not become distorted or biased. It will be obvious that it is also possible to control the gap between the pads 38a and 38b and the magnetic head 31 by moving one or both of these as described above with respect to FIGS. 6(a)–6(b) and 7(a) and 7(b).

High magnetic permeability shields 51 and 53 are also provided at a position opposite the detection surface of magnetic head 31 and behind magnetic head 31, respectively, in this embodiment. Because the magnetic flux density around magnetic head 31 can be reduced by these shields, the effects of external magnetic noise on magnetic head 31 can also be suppressed. In this embodiment, shield 51 placed in front of magnetic head 31 is shaped to cover the magnetic head detection surface 31a, and thereby further reduce magnetic noise. Note that the shield provided behind magnetic head 31 may be a flat shield 54.

Figure 10:
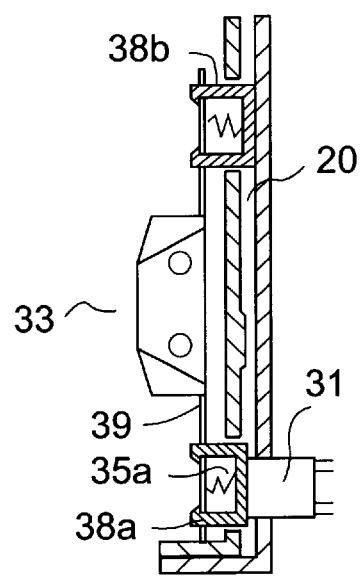
FIG. 10 is a top cross section of the enlarged area around the magnetic head in an integrated processing apparatus according to a further alternative embodiment of the present invention.
Figure 11:
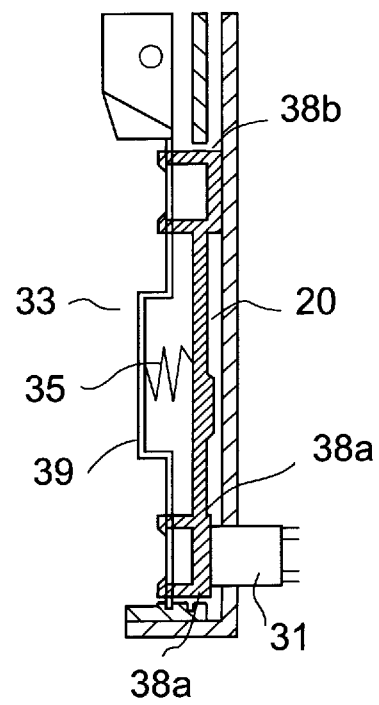
FIG. 11 is a top cross section of the enlarged area around the magnetic head in an integrated processing apparatus according to a further alternative embodiment of the present invention.

Another alternative embodiment of the media presser 33 of the present invention is shown in FIGS. 10 and 11. The media presser 33 shown in FIG. 10 is substantially identical to the media presser shown in FIGS. 9(a) and 9(b), and is installed to paper path 20 at approximately the center of support member 39. The media presser 33 shown in FIG. 11 comprises a torsion coil spring 35 at approximately the center of support member 39 for adjusting the pressure of pads 38a and 38b. The pressure balance of pads 38a and 38b can be adjusted by changing the position of torsion coil spring 35, i.e., by adjusting the gap between torsion coil spring 35 and the right and left pads 38a and 38b. It is thereby possible to adjust the resistance of media presser 33 to achieve a balance resulting in the least skewing or distortion of the check as it passes.

Remagnetization means

The paper path 20 of the present embodiment is also formed from a plastic or other magnetic permeability material, and magnet 32 is imbedded at a back side of paper path 20, i.e., at the side of the member forming paper path 20, over the opposite side of which the cut-sheet form passes. By thus disposing magnet 32, magnet 32 can be easily positioned in the paper path, the surface of the cut-sheet form does not directly contact magnet 32, problems such as the cut-sheet form being damaged or catching on the magnet can be prevented, and magnet 32 will not gradually wear from contact with the paper.

An electromagnet may also be used for magnet 32 in the present embodiment, and is magnetized only during MICR code reading. Adhesion of foreign particulate to magnet 32 is thus also reduced, and less foreign matter will be held by magnet 32. More specifically, even if such foreign matter adheres to magnet 32 during MICR code reading, the magnetic field is canceled when MICR code reading is completed, and the foreign matter will therefore be cleared from the paper path. It is therefore possible by using an electromagnet for magnet 32 to prevent the adhesion of foreign matter to the surface of magnet 32.

It is to be noted that magnet 32 can be replaced by a self-bias type magnetic head comprising a magnetism-generating coil in the core of the magnetic head. In this case, current is supplied to the magnetism-generating coil to produce a DC bias field only during MICR code reading, and the change in this field caused by the MICR code characters is detected by the gap provided in the magnetic head. Because the strength of the bias field generated in this case may be weaker than the field strength required with an electromagnet as described above, the effect of preventing adhesion of foreign particulate is reinforced, and both power consumption and heat output can be reduced.

Control mechanism

Figure 12:
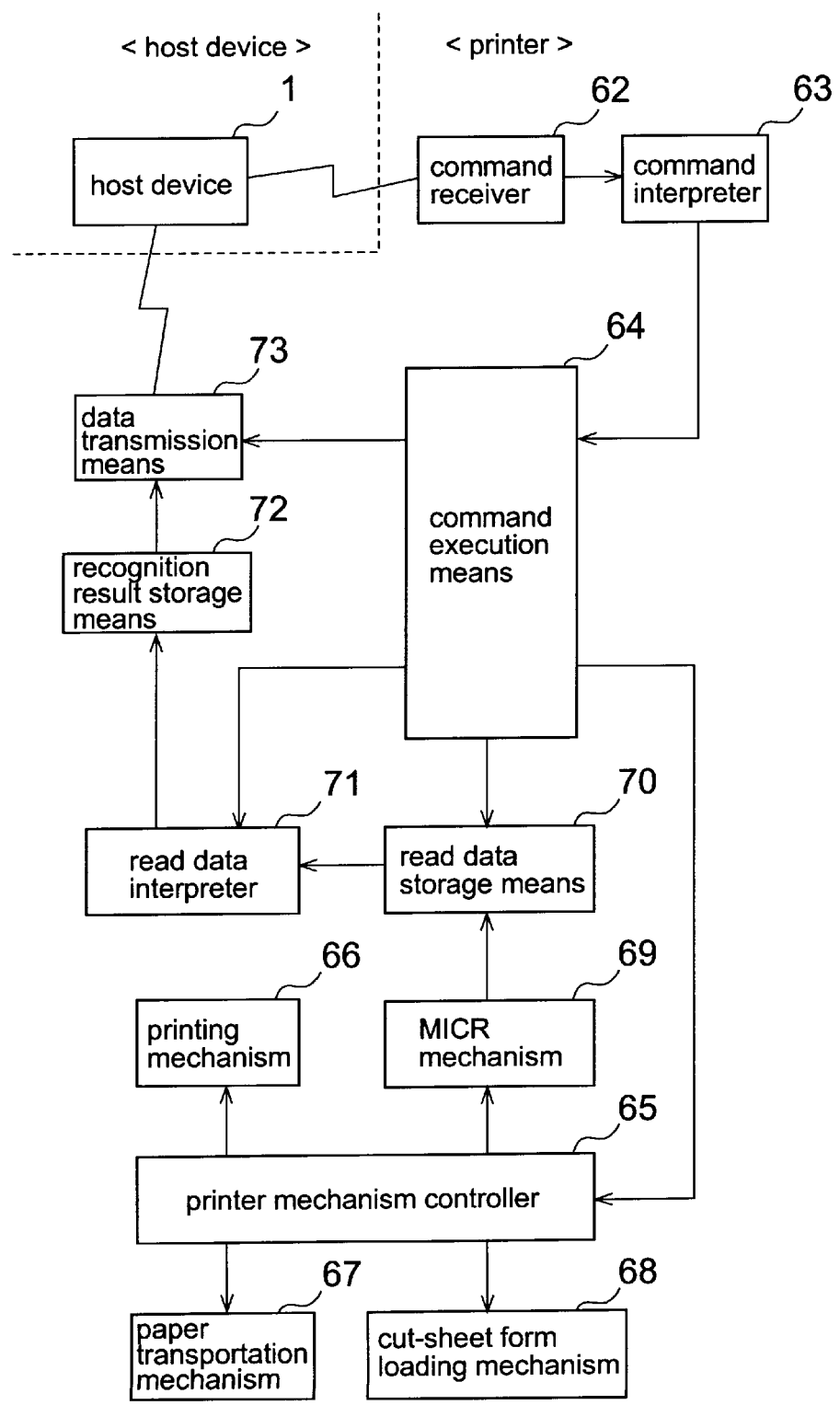
FIG. 12 is at function block diagram of an integrated processing apparatus shown in FIG. 1.

FIG. 12 is a block diagram of the functions of a printer according to the present embodiment. With this apparatus, the commands input through a communications circuit from host device 1 to command receiver 62 are interpreted by command interpreter 63 and then executed by command execution means 64.

Printer mechanism controller 65 controls printer mechanism 90 (see FIG. 13) comprising printing means 66, paper transportation means 67 for transporting roll paper and cut-sheet forms, cut-sheet form loading mechanism 68 for loading cut-sheet forms to the print start position, and magnetic ink character reading (MICR) means 69 for reading the MICR code imprinted to the check (or other cut-sheet form), based on the instructions input from command execution means 64.

Under the control of the command execution means, the data read by MICR means 69 is temporarily stored to read data storage means 70, and then converted to character data by read data interpreter 71. The recognition result is temporarily stored to recognition result storage means 72, and is then sent to host device 1 by data transmission means 73.

Figure 13:
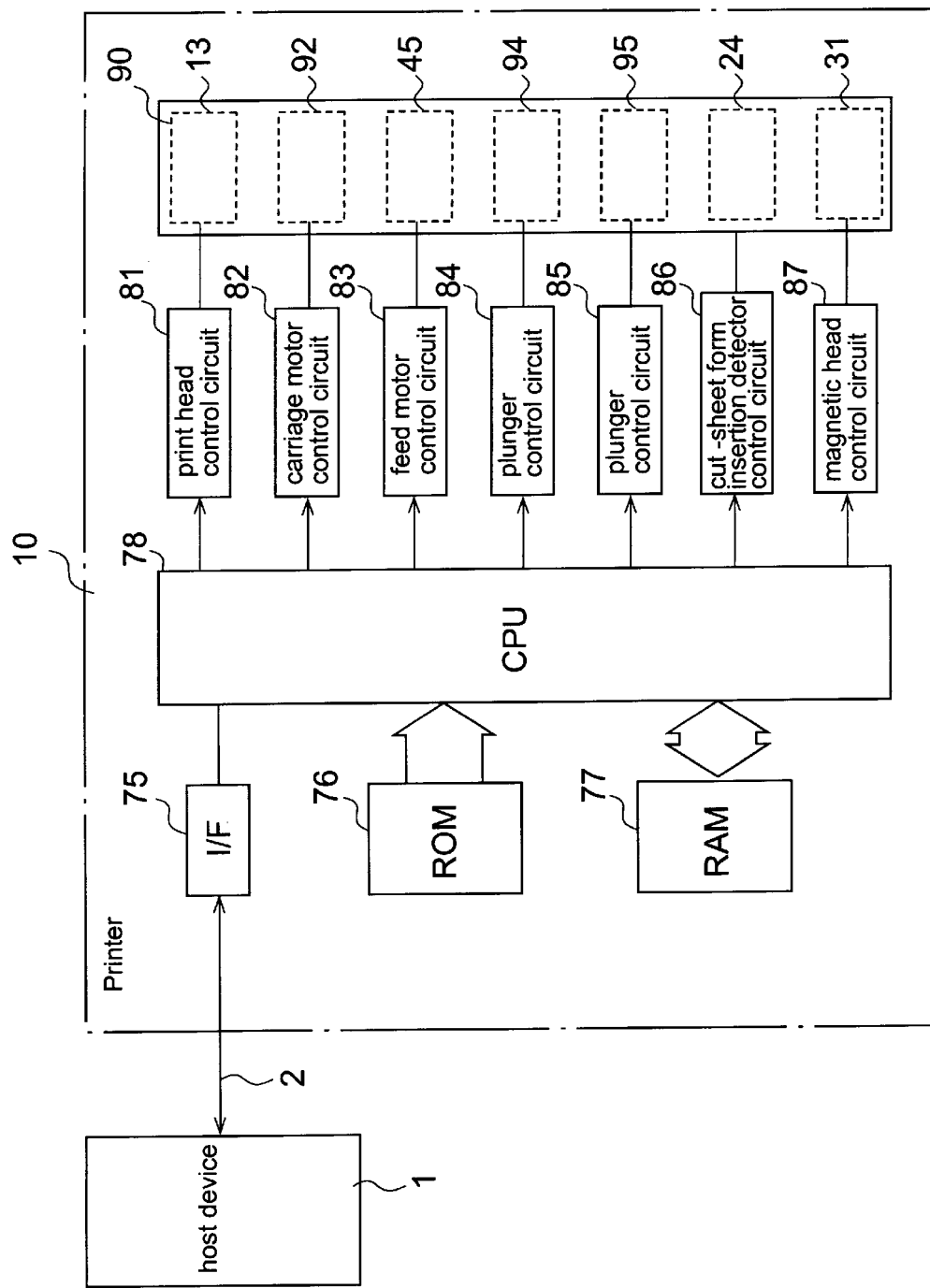
FIG. 13 is a control block diagram of an integrated processing apparatus shown in FIG. 1.

FIG. 13 is a control block diagram showing the overall configuration of the printer used by way of example to describe the preferred embodiment of the present invention. Note that printer mechanism 90 comprises components from various other subsystems, including print head 13 and stepping motor 92, which is the drive power source for the print head, contained in printing means 66; stepping motor 45, which is the drive power source for the paper transportation means, and paper transportation drive power transfer system switching mechanism 94 contained in paper transportation means 67; loading roller closing mechanism 97 and cut-sheet form paper detector 24 contained in cut-sheet form loading mechanism 68; and magnetic head 31 contained in MICR means 69.

CPU 78 functions as command execution means 64 and read data interpreter 71 according to the control program stored to ROM 76. RAM 77 is used for temporary storage by CPU 78, read data storage means 70, and recognition result storage means 72. More specifically, read data storage means 70 converts the character waveforms, output by magnetic head 31 to digital data and stores the converted digital data to RAM 77, and recognition result storage means 72 stores the MICR code recognition results to RAM 77.

Interface 75 functions as both command receiver 62 for receiving data output from host device 1, and as data transmission means 73 for transferring to host device 1 the MICR code recognition results.

Print head control circuit 81, print head motor control circuit 82, paper transportation motor control circuit 83, plunger control circuit 84, plunger control circuit 85, cut-sheet form insertion detector control circuit 86, and magnetic head control circuit 87 constitute printer mechanism controller 65.

In the printer of the present embodiment, the operation of presser roller 34 is controlled to press the cut-sheet form personal check) against magnetic head 31 only when required for MICR code reading. As shown in FIGS. 12 and 13, however, a control mechanism and control circuit for moving presser roller 34 are not specifically provided. This is because presser roller 34 is designed to move in conjunction with the operation of print head 13 in the printer of the present embodiment, and the operation of presser roller 34 can be controlled by means of print mechanism and print head motor control circuit 82. The control system can thus be simplified by moving presser roller 34 in conjunction with the operation of print head 13.

Control methods

Control method 1

Figure 14:
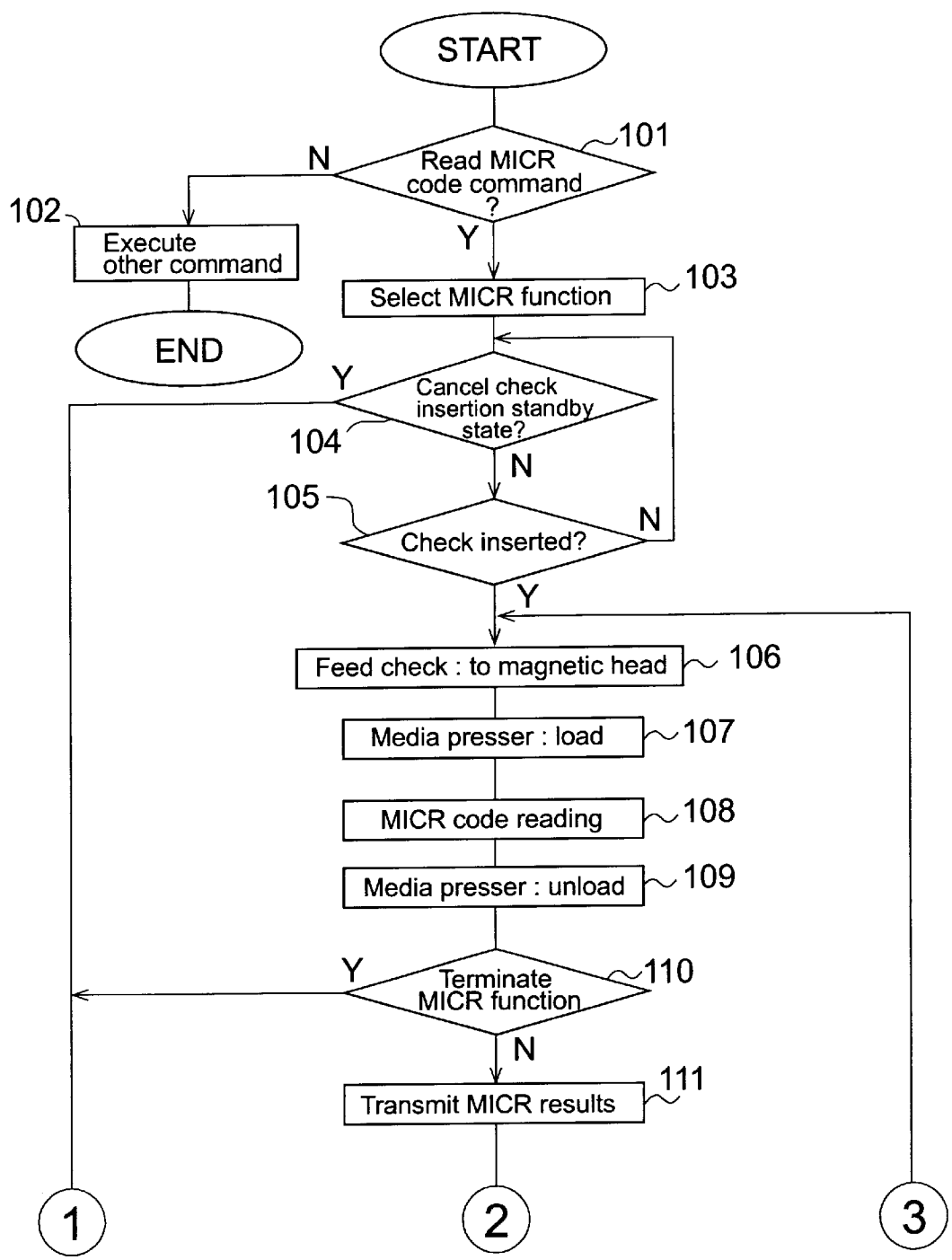
FIG. 14 is a flow chart of a first control method according to the present invention.
Figure 15:
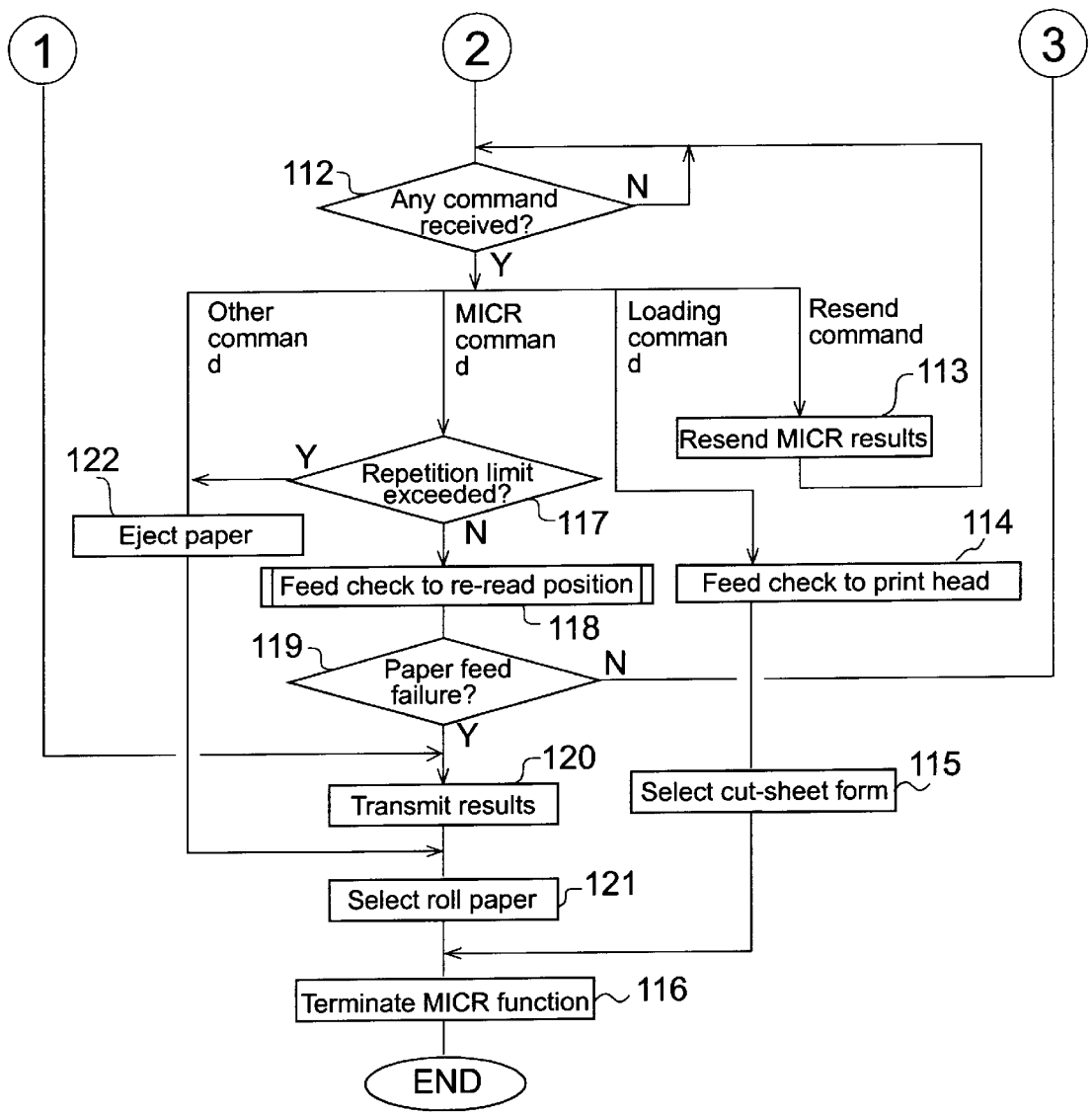
FIG. 15 is a continuation of the flow chart of a first control method according to the present invention.

The control method of the present invention for reading the MICR code printed to a personal check and then conditionally printing a check endorsement to the back of the personal check is described below with reference to FIGS. 14 and 15. FIGS. 14 and 15 are flow charts of the preferred control method of the present invention for controlling the operation of the preferred printer mechanism of the invention as shown in FIG. 3 from MICR code reading to endorsement printing.

Figure 16:
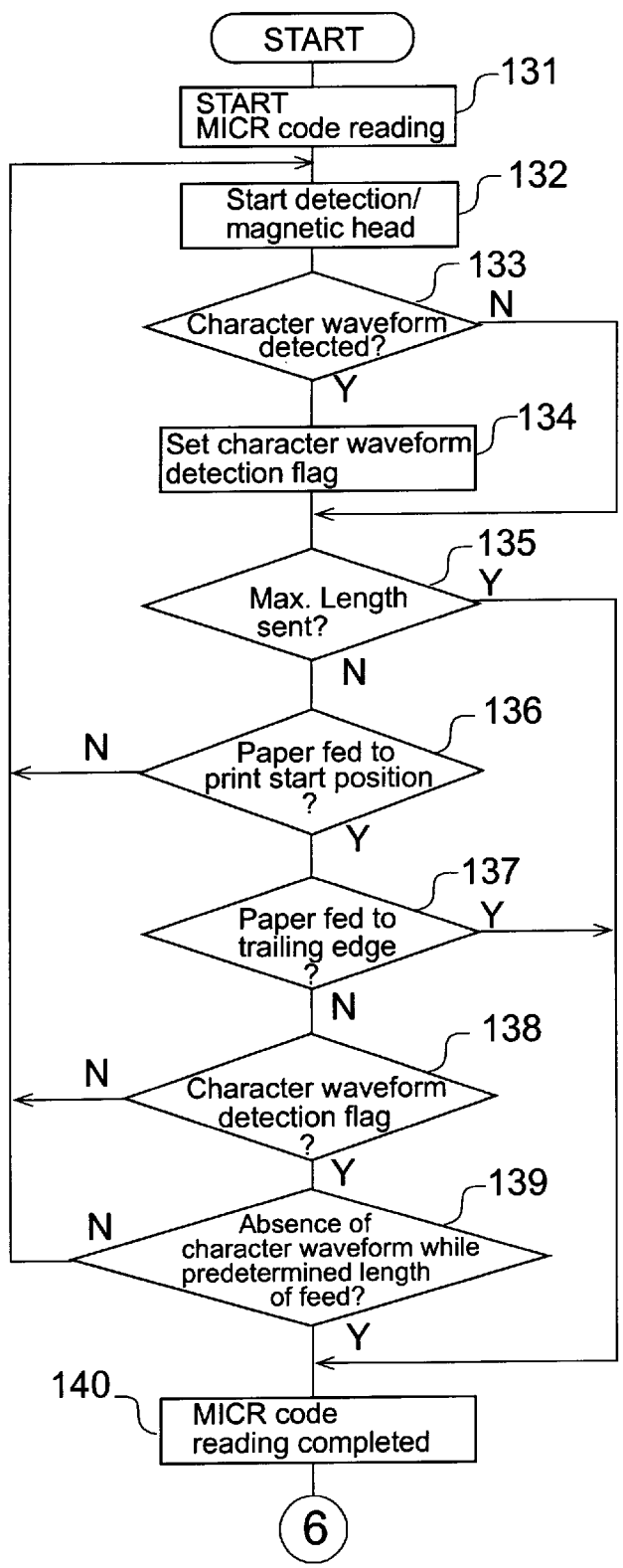
FIG. 16 is a flow chart of the MICR code reading process executed in the printer shown in the preferred embodiment of the invention.
Figure 17:
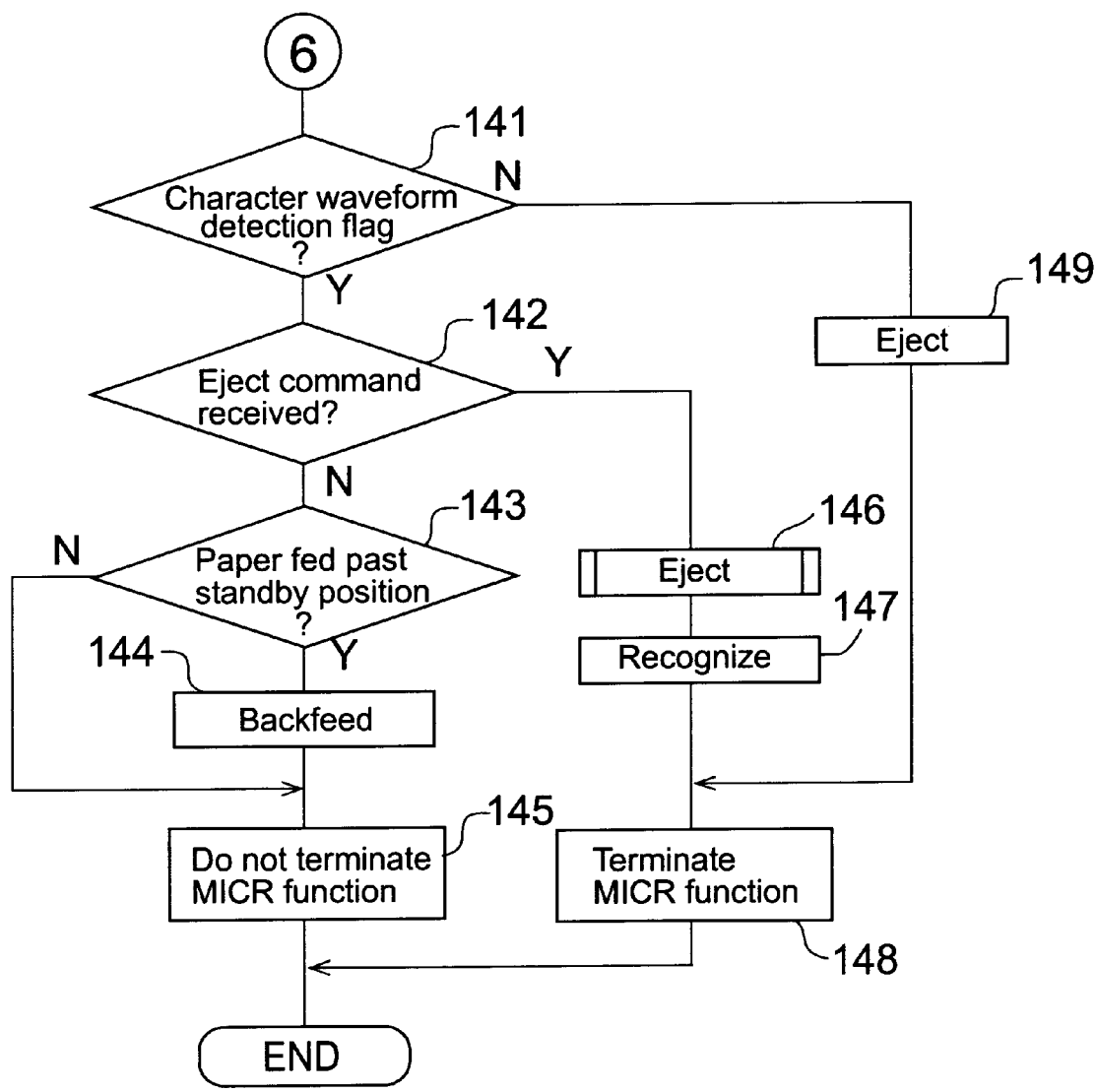
FIG. 17 is a continuation of the flow chart of the MICR code reading process executed in the printer shown in the preferred embodiment of the invention.
Figure 19:
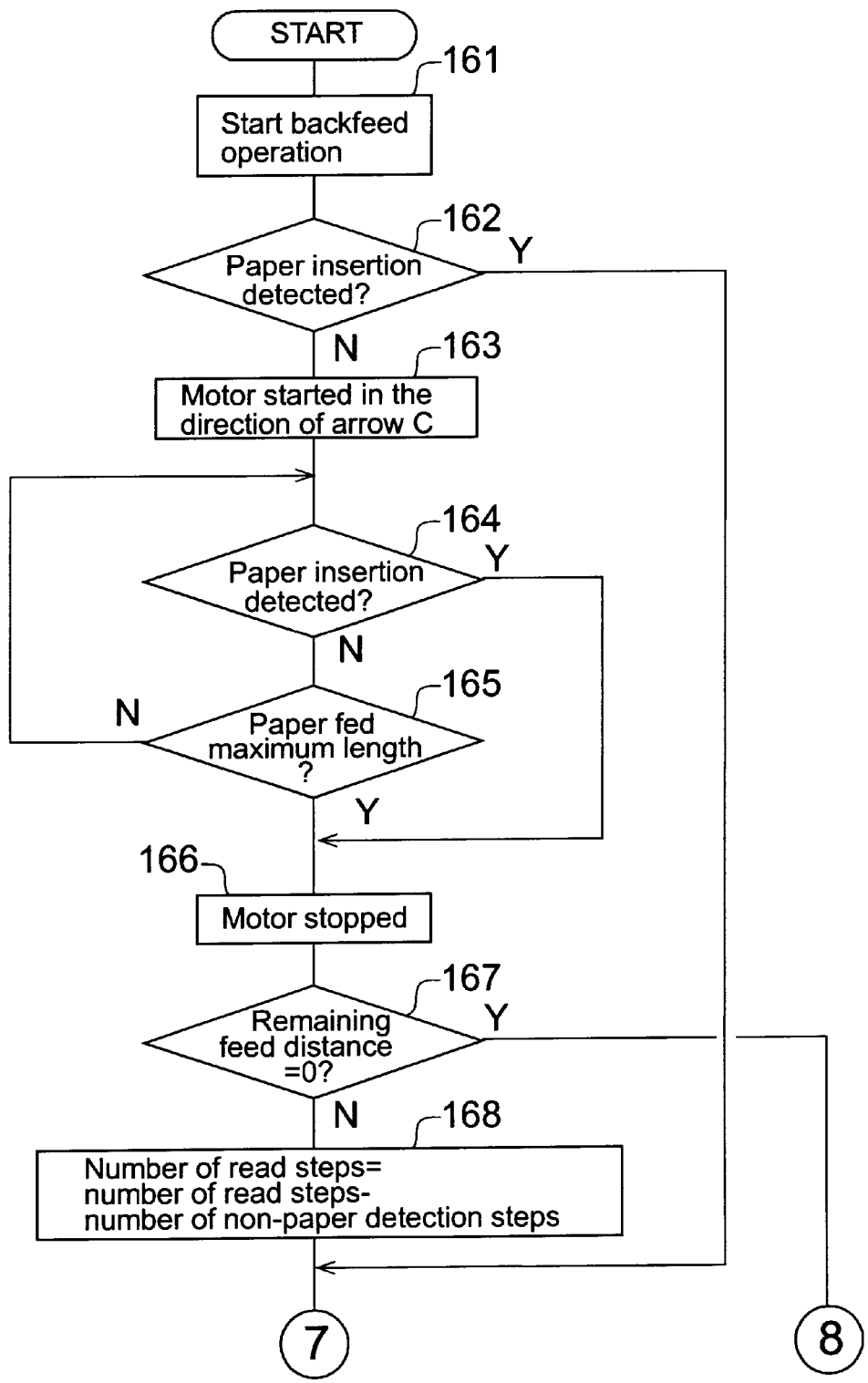
FIG. 19 is a flow chart of the process transporting the check to the re-read position in the printer shown in the preferred embodiment of the invention.
Figure 20:
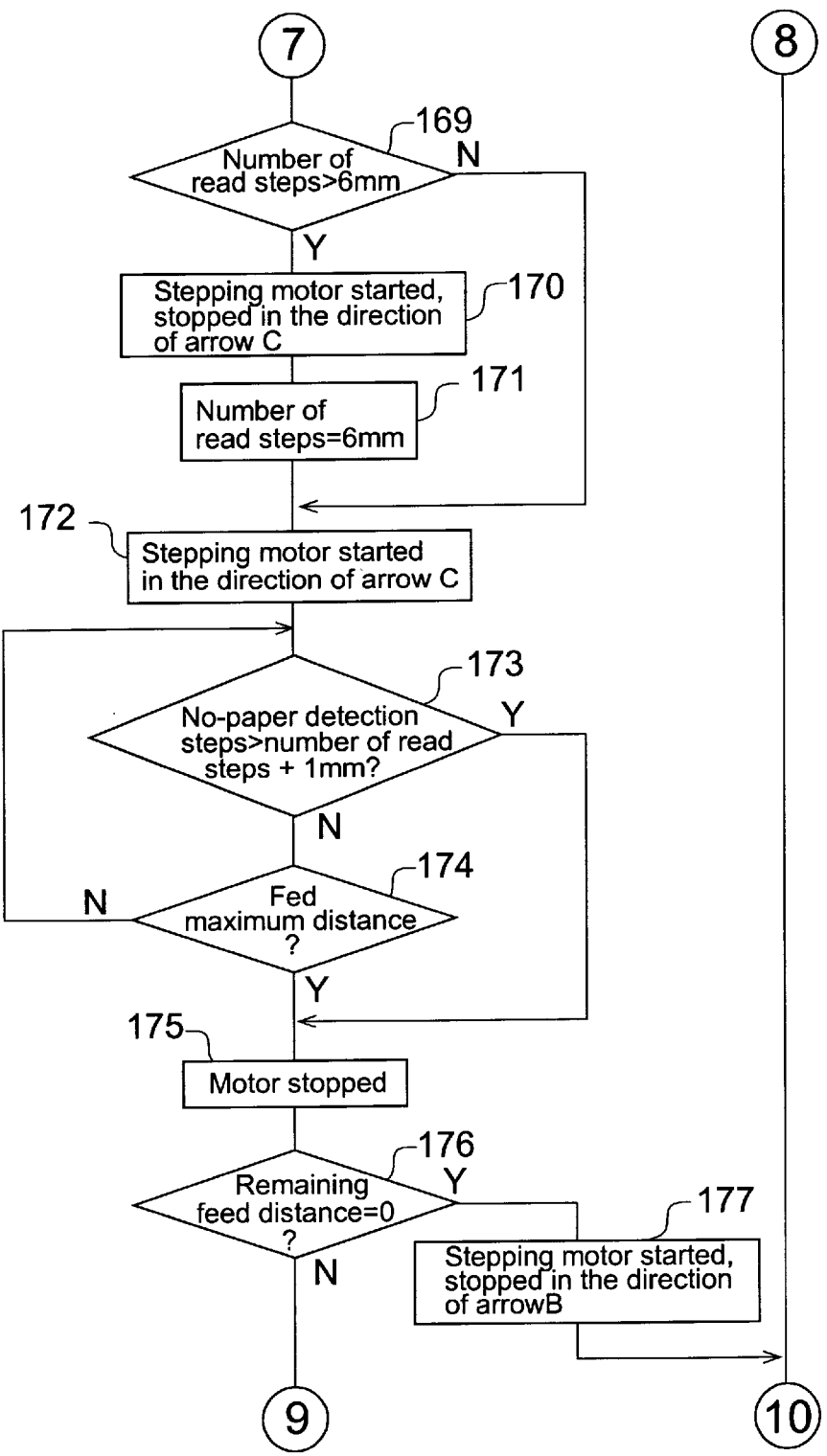
FIG. 20 is a continuation of the flow chart of the process transporting the check to the re-read position in the printer shown in the preferred embodiment of the invention.
Figure 21:
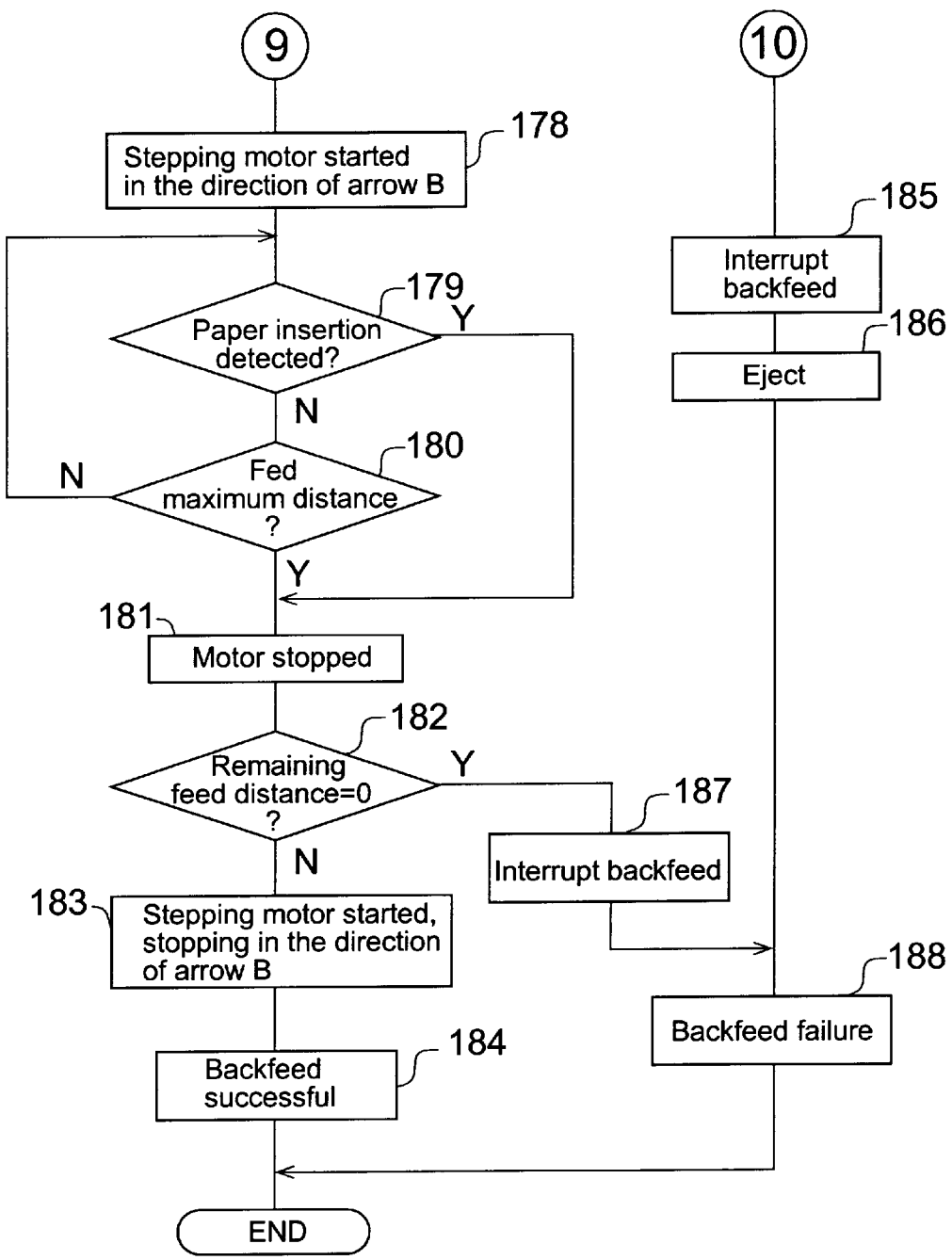
FIG. 21 is a continuation of the flow chart of the process transporting the check to the re-read position in the printer shown in the preferred embodiment of the invention.

FIGS. 16 and 17 are detailed flow charts of the MICR code reading operation shown as step 108 in FIG. 14. FIGS. 19, 20, and 21 are detailed flow charts of the back-feed operation, shown as step 118 in FIG. 15, used for re-reading the MICR code.

The first step of the procedure determines whether the command sent from the host device is the 'read MICR code' command (step 101); if it is not, the received command is executed (step 102).

If the received command is the read MICR code command, the MICR code read function is selected, i.e., the paper transportation drive power transfer system switching mechanism is switched to drive cut-sheet form transportation rollers 29 and cut-sheet form loading rollers 23. The one cut-sheet form loading roller 23 is thus moved in the direction of arrow E and form stopper 25 is moved in the direction of arrow F to the open position of the loading roller closing mechanism, and a check insertion standby state is started with the MICR code read function described below selected (step 103).

The MICR code read function in this example is the function for reading the MICR code printed to the personal check. When the MICR code read function is selected, i.e., when in the MICR code reading mode, the printer apparatus of the present invention is used for check processing and not for normal cut-sheet forms printing. It is necessary to select the operating function as described above because the paper path and paper feed mechanism is used for both cut-sheet forms printing and MICR code reading. When the MICR code read function is selected, the inserted cut-sheet form 16 Ls assumed to be a check to which an MICR code is printed. As a result, the cut-sheet form 16 indicated in the figures is assumed to be a personal check 16 until the MICR code read function is deselected.

If the operator executes a cancel (step 104) before inserting a personal check 16 during the check insertion standby mode, the check insertion standby mode is terminated, and a status signal indicating an abnormal read termination is output (step 120). In this case, the paper transportation drive power transfer system switching mechanism switches to drive roll paper transportation rollers 41a, 41b (step 121), and the MICR code read function is deselected (step 116).

Note that this cancel operation is accomplished based on a command input from the host device instructing cancellation of the check insertion standby mode, or by the operator operating a switch means.

When the operator inserts a personal check for MICR code reading and endorsement, the check 16 is inserted face down (MICR code face down) with the MICR code to the right side, i.e., in the normal endorsement position described previously above, of the cut-sheet form paper path to the cut-sheet form insertion position 26. When the check is detected by paper detector 24 (step 105), cut-sheet form loading roller 23 is moved in the direction of arrow D to hold personal check 16, and form stopper 25 is retracted from the paper path in the direction of arrow G to the closed position of the loading roller closing mechanism, and the personal check is advanced until the leading edge of the check reaches magnetic head 31 (step 106). From this position, print head 13 is moved in the direction of arrow K to a predetermined position outside the printing area, and personal check 16 is pressed to magnetic head 31 by media presser 33 (step 107). This completes preparations for MICR code reading to begin, which is executed at step 108.

The process executed after MICR code reading is described further. First, print head 13 is moved in the direction of arrow L (FIG. 6(a)), the media presser roller is separated from magnetic head 31, and the pressure on personal check 16 is released (step 109). This reduces wear between personal check 16 and magnetic head 31 when personal check 16 is thereafter transported, and thereby prevents unnecessary wear of the magnetic head detection surface 31a. By releasing the pressure applied by the media presser roller, any foreign matter held by the media presser roller can also be removed, which may be required to enable MICR code reading when re-reading is necessary as described below.

When the MICR code read function end flag is set (step 110) during the MICR code reading process (step 108), the process results are output to the host device by data transmission means 73 (step 120), the paper transportation drive power transfer system switching mechanism is reset to drive roll paper transportation rollers 41a, 41b (step 121), and the MICR code read function terminates (step 116). The results output to the host device in step 120 include a status report indicating whether reading was normally completed, and the character data stored to recognition result storage means 72 when the MICR code is detected and character recognition is completed.

When the MICR code read function end flag is cleared (step 110) during the MICR code reading process (step 108), the data stored to read data storage means 70 is interpreted and recognized by read data interpreter 71, and converted to character data. This character data is also stored to recognition result storage means 72 (step 111). When recognition processing is completed, the recognition results are sent by data transmission means 73 to the host device (step 111), and the command receive standby state is entered. The recognition results output to the host device in step 111 include a status report indicating whether reading was normally completed, and the character data stored to recognition result storage means 72.

The command receive standby state (step 112) waits for a recognition results re-send command from the host device. This state is canceled when a command other than the re-send recognition results command is received (steps 122, 117, and 114).

When the MICR code read function is selected, i.e., during the MICR code reading mode, there are only five executable commands, specifically, the check insertion standby cancel command, re-send recognition results command, load check command (described below), check eject command, and the read MICR code command. However, when the number of read operations per check insertion is limited due, for example, to limitations of the printer mechanism, and the limited number of read operations is already executed (step 117), the read MICR code command is not executed and check ejection is executed (step 122) as occurs when a command other than the read command, load command, or re-send command is received. Note that when the number of read operations is limited, status information indicating whether the read MICR code command is executable is added to the recognition results sent after MICR code reading is completed.

The check insertion standby cancel command, load check command, and check eject command cannot be executed when the MICR code read function is not selected, and the corresponding processes are not executed even if these commands are received when the MICR code read function is not selected.

When the re-send recognition results command is received (step 113), the printer sends to the host device the recognition results from the last-executed read operation (step 113).

When the load check command is received (step 114), stepping motor 45 is then started to transport personal check 16 by means of cut-sheet form loading rollers 23 in the direction of arrow C to cut-sheet form print start position 27 (step 114). The paper transport distance at this time is the difference of the "number of read steps" stored in step 145 of the MICR code reading process shown in FIG. 17, and the "number of steps to the cut-sheet form print start position", a known constant value of the specific printer.

When loading personal check 16 to the print start position is completed, the one cut-sheet form loading roller 23 is moved in the direction of arrow E and form stopper 25 is moved in the direction of arrow F to the open position of the loading roller closing mechanism. The MICR code read function is then terminated, and the printer apparatus is set up for endorsement printing by the same process used for printing to cut-sheet forms (steps 115, 116).

The personal check eject process (step 122) is executed when a command other than the load check command or read MICR code command is received, or when the read MICR code command is received after the read operation has been executed a predetermined number of times. This eject process is described below.

First, stepping motor 45 is started and personal check 16 is advanced in the direction of arrow B. When the trailing edge of personal check 16 passes cut-sheet form paper detector 24 and the check is not detected by paper detector 24, personal check 16 is advanced a distance slightly greater than the distance d1 from cut-sheet form insertion position 26 to cut-sheet form transportation rollers 29. This frees personal check 16 from the grip of the cut-sheet form transportation rollers, and permits the operator to easily remove personal check 16 from the paper path. The paper transportation drive power transfer system switching mechanism is then reset to drive roll paper transportation rollers 41a, 41b (step 121), and the MICR code read function is terminated (step 116).

It is to be noted that the unexecuted commands are not simply flushed at this time, but are executed after the MICR code read function is terminated. For example, if the single check read limit has been exceeded but the read MICR code command has been received, the loaded personal check is ejected without the read MICR code command being executed again (steps 112, 117, 122), the MICR code read function is terminated once (steps 121, 116), and the read MICR code command is then re-executed.

If the read MICR code command is received in the command receive wait state (step 112) and the number of read operations does not exceed the per check read limit (step 117), the back-feed process (step 118) described below is executed to return personal check 16 to cut-sheet form insertion position 26 and repeat the MICR code reading operation.

The back-feed process (step 118) and subsequent processes are described below. If the back-feed is determined to have failed (step 119) in the back-feed process (step 118) for repeating the MICR code reading operation, a status flag indicating abnormal termination of the read operation is output (step 120), the paper transportation drive power transfer system switching mechanism is changed to drive roll paper transportation rollers 41a, 41b, roll paper printing is enabled (step 121), and the MICR code read function is terminated (step 116). If the backfeed is determined to have succeeded (step 119), however, control loops back to the start of setup for MICR code reading (step 106).

MICR code reading process

The MICR code reading process (step 108) is described next with reference to FIGS. 16 and 17. The process starts by starting stepping motor 45 to drive cut-sheet form loading rollers 23 and begin transportation of personal check 16 in the direction of arrow B (step 131). Note that in the present embodiment an electromagnet is used for the MICR code remagnetizing magnet 32, and it is therefore necessary to begin current supply to said electromagnet before transporting the check.

Thereafter and until reading is terminated in step 140, the MICR code printed on the check and remagnetized by magnet 32 built in to the cut-sheet form paper path passes over magnetic head 31, magnetic head 31 thus detects the change in the magnetic flux resulting from the MICR code, converts the detected flux change to an electrical signal, and outputs said signal (step 132). This output signal is converted to a digital signal by magnetic head control circuit 87, and is stored to read data storage means 70 in RAM 77.

When a change in the magnetic flux is detected from the output signal of magnetic head 31 (step 133), it is assumed that MICR codes were detected, and character waveform detection is determined completed (step 134).

MICR code reading continues until one of the following three conditions are satisfied: (1) the personal check 16 transportation distance reaches the maximum readable length, which is determined by the capacity of RAM 77 and the paper feed resolution of printer mechanism 90 (step 135); (2) personal check 16 is advanced to cut-sheet form print start position 27 (step 136), and is then advanced to just before the trailing edge of personal check 16 separates from magnetic head 31 (step 137); (3) character waveform detection is determined completed in step 134, personal check 16 is then advanced to cut-sheet form print start position 27 (step 136), character waveform detection is completed in step 138, and personal check 16 is then advanced a predetermined distance from that point (step 139).

The "predetermined distance" of step 139 in this embodiment is expressed as the width of three MICR characters. As a result, when non-detection of the character waveform continues for a distance equivalent to the width of three characters, reading is determined completed, and the terminate MICR code reading process (step 140) is initiated. Because this predetermined distance is preferably determined according to the MICR code format, the predetermined distance can be set and changed by means of a command from host device 1.

When the above terminate MICR code reading conditions are satisfied, personal check 16 transportation is stopped and reading is ended (step 140).

If character waveform detection is not completed (step 141), or the check eject command has already been received by the time reading is completed (step 142), in the preceding reading process, the one cut-sheet form loading roller 23 is moved in the direction of arrow E and form stopper 25 is moved in the direction of arrow F to the open position of the loading roller closing mechanism, stepping motor 45 is started, and personal check 16 is fed in the direction of arrow B. When personal check 16 passes and is no longer detected by paper detector 24, personal check 16 is advanced a distance slightly greater than the distance d1 from cut-sheet form insertion position 26 to cut-sheet form transportation rollers 29. This frees personal check 16 from the grip of the cut-sheet form transportation rollers, and permits the operator to easily remove personal check 16 from the paper path (steps 146, 149).

However, if character waveform detection is determined completed in step 134 (step 141), the check is ejected (step 146), and the data stored to read data storage means 70 is interpreted and recognized by read data interpreter 71, and converted to character data (step 147). The recognized characters are stored to recognition result storage means 72 as character data. It is to be noted that various methods of the prior art can be used in the data interpretation and recognition process executed by read data interpreter 71, and further description thereof is omitted below.

Once personal check 16 is ejected, control flows back to the main process shown in FIG. 14, and the MICR code read function end flag is set in step 148 to terminate the MICR code read function in step 110.

Furthermore, when character waveform is detected (step 141) and the check eject command has not been received when reading is completed (step 142), the paper feed distance of the MICR code reading process is adjusted. Specifically, if the leading edge of the check has been advanced beyond check standby position 30 (described below; see FIG. 3) (step 143), the check is back-fed in the direction of arrow C (step 144) to check standby position 30.

In the present embodiment check standby position 30 is set to a position at which it is difficult for the operator to grasp personal check 16. This is because if the printer apparatus stops with the leading edge of personal check 16 projecting noticeably from printer mechanism 90 or the case housing printer mechanism 90, the operator may try to remove a check to which printing has not been completed. The position of check standby position 30 is therefore not limited to the position shown in the present embodiment, and may be variously set with consideration given to such factors as the structure of the printer mechanism.

When adjustment of the paper transportation distance is completed, one cut-sheet form loading roller 23 is moved in the direction of arrow E and form stopper 25 is moved in the direction of arrow F to the open position of the loading roller closing mechanism. Because re-reading and other functions may be executed in the process shown in FIG. 15 in this case, the MICR code read function end flag is cleared (step 145) so that the MICR code read function is not terminated even if control flows back to the main procedure shown in FIG. 14.

The total paper feed distance from cut-sheet form insertion position 26 to the current position is stored as the "number of read steps," and the total paper feed distance from no-paper detection by paper detector 24 to the current position is also stored as the "number of no-paper detection steps" (step 145).

Check ejection process

Figure 18:
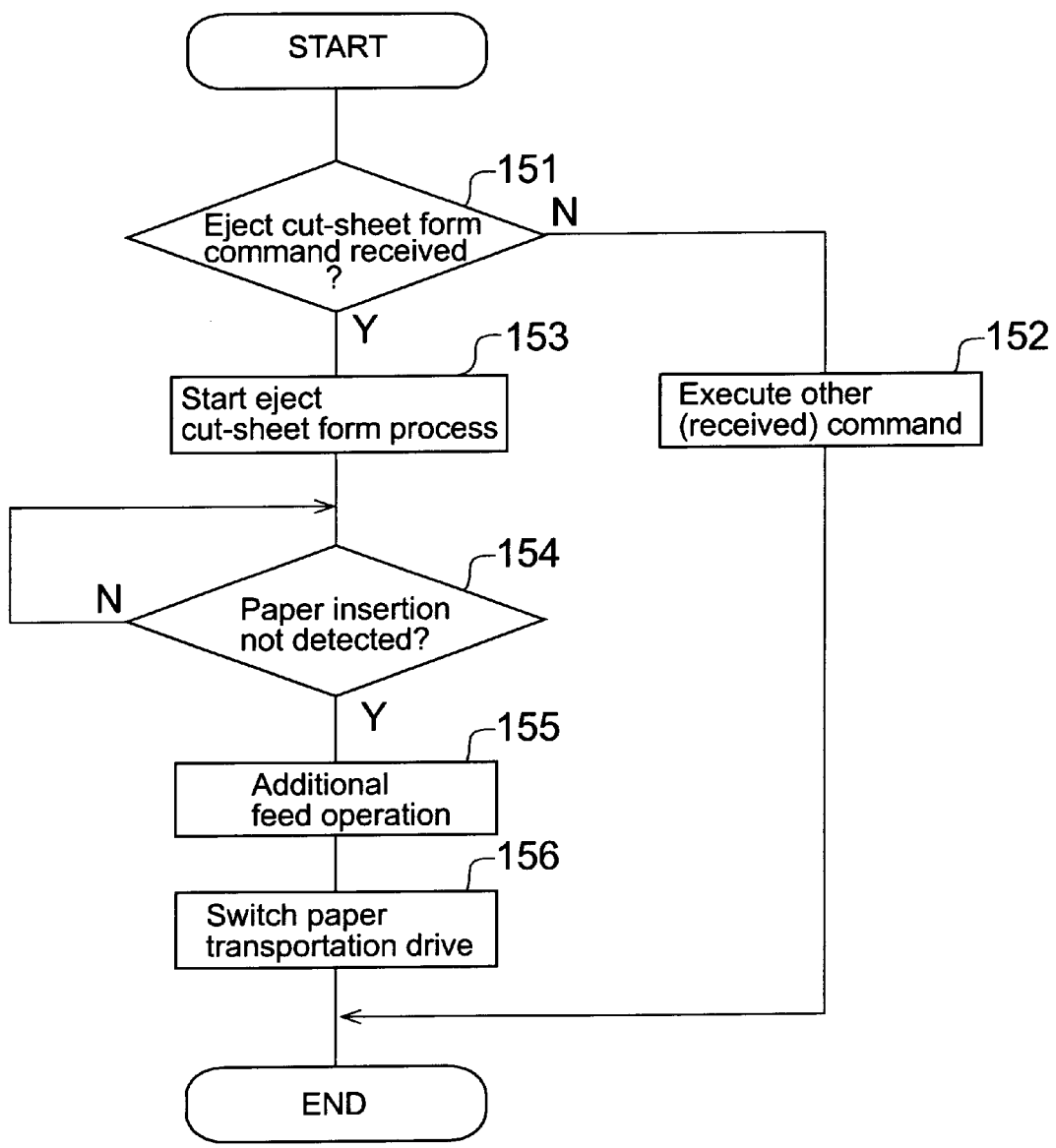
FIG. 18 is a flow chart of the check ejection process in the printer shown in the preferred embodiment of the invention.

The check ejection process executed in the MICR code reading process described above is described below. FIG. 18 is a flow chart of the preferred embodiment of the control method for controlling the preferred embodiment of a printer mechanism according to the present invention as shown in FIG. 3 to eject a cut-sheet form.

When the "eject cut-sheet form" command is received from host device 1, the command is received, interpreted, and executed according to a predetermined procedure. Specifically, it is determined whether the received command is the cut-sheet form eject command (step 151); if it is, stepping motor 45 is started to advance the personal check 16 in the direction of arrow B, i.e., transportation in the eject direction begins (step 153). Once personal check 16 advances to a position where it is no longer detected by cut-sheet form paper detector 24 (step 154), it is advanced a distance slightly greater than the distance d1 from cut-sheet form insertion position 26 to cut-sheet form transportation rollers 29. This frees personal check 16 from the grip of the cut-sheet form transportation rollers, and permits the operator to easily remove personal check 16 from the paper path (step 155).

The paper transportation drive power transfer system switching mechanism is then reset to drive roll paper transportation rollers 41a, 41b, and printing to roll paper 15 is enabled (step 156).

If any command other than the cut-sheet form eject command is received in step 151, that command is executed (step 152).

Paper feed to the re-read position

The back-feed process (step 118) executed while processing the read MICR code command as shown in FIG. 14 is described below with reference to the flow charts in FIGS. 19, 20, and 21. The back-feed operation executed to repeat the MICR code reading process starts by moving cut-sheet form loading roller 23 in the direction of arrow D, and retracting form stopper 25 from the paper path in the direction of arrow G to the closed position of the loading roller closing mechanism (step 161).

If personal check 16 has already passed cut-sheet form paper detector 24 when reading is completed (step 162), the "number of no-paper detection steps" stored in step 145 during reading is increased by several ten steps to define a maximum paper feed limit, and stepping motor 45 is started to back-feed personal check 16 in the direction of arrow C (step 163). Several ten steps are added to the stored value to present an insufficient back-feed distance as a result of backlash in the gears of the printer mechanism shown in FIG. 3, or an offset detection position resulting from hysteresis error during check detection by cut-sheet form paper detector 24. Back-feeding personal check 16 in the direction of arrow C continues until paper detector 24 detects the trailing edge of personal check 16 (i.e., the leading edge when the check is inserted), or until the feed distance reaches the previously defined maximum limit (step 165).

If the remaining feed distance is 0 (step 167) when processing is completed and stepping motor 45 stops (step 166), the trailing edge of personal check 16 has not been detected even though the check has been back-fed the maximum allowable distance. An error is therefore determined to have occurred, and processing terminates. More specifically, one cut-sheet form loading roller 23 is moved in the direction of arrow E and form stopper 25 is moved in the direction of arrow F to the open position of the loading roller closing mechanism (step 185), and stepping motor 45 is started to advance personal check 16 in the direction of arrow B and begin ejecting the check. Then, once personal check 16 passes paper detector 24, personal check 16 is advanced a distance slightly greater than the distance d1 from cut-sheet form insertion position 26 to cut-sheet form transportation rollers 29 (step 186). This frees personal check 16 from the grip of the cut-sheet form transportation rollers, and permits the operator to easily remove personal check 16 from the paper path. After the check is ejected, a flag is set indicating that back-feed failed (step 188), and the procedure returns to the main procedure shown in FIG. 15.

On the other hand, if the remaining feed distance is greater than 0 (step 167) when processing is completed and stepping motor 45 stops (step 166), the "number of no-paper detection steps" is subtracted from the "number of read steps", and the difference is stored as the new "number of read steps" (step 168). In this case the trailing edge of personal check 16 has reached the detection position of cut-sheet form paper detector 24, and control passes to the routine executed when personal check 16 is detected by cut-sheet form paper detector 24 at the beginning of the back-feed operation.

When the remaining number of read steps converted to physical paper length is 6 mm or greater (step 169), stepping motor 45 is started and personal check 16 is back-fed in the direction of arrow C a distance equal to the number of read steps minus the number of steps equal to 6 mm (step 170). The number of read steps is then updated to the number of steps equal to 6 mm (step 171). If the remaining number of read steps converted to physical paper length is less than 6 mm (step 169), steps 170 and 171 are skipped.

The above process enables back-feeding to be executed quickly and accurately. Specifically, because the leading edge of personal check 16 must be accurately detected, the presence of personal check 16 is confirmed by the cut-sheet form paper detector 24 every step or every plural steps. The feed rate of personal check 16 can therefore not be set too high in this process. This process is therefore executed only when the leading edge of personal check 16 is near cut-sheet form paper detector 24, and personal check 16 is transported at high speed at all other times. The threshold value determining "near" in this embodiment is "the number of steps equivalent to 6 mm when converted to physical paper length."

The process for detecting the leading edge of personal check 16 is described next. The basis for leading edge detection is (attempted) transportation of personal check 16 for a predetermined distance with personal check 16 not detected by paper detector 24. In the present embodiment this "predetermined distance" is the sum of the remaining number of read steps plus the number of steps equivalent to 1 mm. This is because if personal check 16 is not detected during transportation for a distance exceeding this predetermined distance, the possibility that personal check 16 will be detected again thereafter is extremely low, even if the reason why the form is not detected is that it has a hole or damage in the part extending beyond form stopper, because the remaining number of read steps corresponds to the length inside from form stopper 25. While the probability of detection rises to a certain limit as this predetermined distance increases, processing time also increases and the possibility of the personal check separating from the cut-sheet form loading rollers increases. In the present embodiment, the distance from cut-sheet form loading rollers 23 to paper detector 24 is approximately 12 mm, and personal check 16 will not separate from cut-sheet form loading rollers 23 if the above predetermined distance exceeds this distance (12 mm).

The maximum feed distance of personal check 16 in this process is set next. The feed distance until the leading edge of personal check 16 reaches the detection position of paper detector 24, and a margin of several ten steps allowing for slippage of personal check 16 in the paper path, are added to the above predetermined distance to obtain this maximum feed distance in the present embodiment. Note that this margin corresponds to a feed distance of approximately 10 mm in this embodiment.

After setting these values, stepping motor 45 is started and transportation of personal check 16 in the direction of arrow C begins (step 172). If stepping motor 45 operates for a period corresponding to the defined predetermined distance with paper detector 24 not detecting personal check 16 (step 173), or if the personal check feed distance reaches the defined maximum distance (step 174), stepping motor 45 stops (step 175).

If the remaining feed distance is 0 steps at this time (step 176), it is determined that the paper is not detectable because of some error or problem. Personal check 16 is therefore advanced in the direction of arrow B for a number of steps equivalent to the distance from form stopper 25 to cut-sheet form print start position 27 (step 177), one cut-sheet form loading roller 23 is moved in the direction of arrow E and form stopper 25 is moved in the direction of arrow F to the open position of the loading roller closing mechanism (step 185), and the check is ejected (step 186). To eject the check, stepping motor 45 is operated to feed personal check 16 in the direction of arrow B as previously described. If personal check 16 advances past paper detector 24 and a no-paper state is detected, personal check 16 is advanced a distance slightly greater than the distance d1 from cut-sheet form insertion position 26 to cut-sheet form transportation rollers 29, and stepping motor 45 is stopped. This frees personal check 16 from the grip of the cut-sheet form transportation rollers, and permits the operator to easily remove personal check 16 from the paper path. A flag indicating a back-feed failure is then set (step 188), and control returns to the main procedure shown in FIG. 15.

The following problems may occur if personal check 16 is not advanced a number of steps equivalent to the distance from form stopper 25 to cut-sheet form print start position 27 in the direction of arrow B. Specifically, it is possible that personal check 16 is not held by cut-sheet form transportation rollers 29 because of some error or problem, in which case personal check 16 is held only by cut-sheet form loading rollers 23. When the loading roller closing mechanism is open, personal check 16 is held by no rollers, and ejection is therefore impossible.

If the remaining feed distance is not 0 steps (step 176), a margin of several ten steps is added to the number of continuous no-paper detection steps by looping through steps 172 to 175, and stepping motor 45 is operated to feed personal check 16 in the direction of arrow B using this sum as the maximum feed distance (step 178). The stepping motor stops (step 181) when paper detector 24 detects the check (step 179), or the check is advanced the maximum feed distance (step 180).

If the remaining number of steps is 0 when stepping motor 45 stops (step 182), it is determined that paper detection is not possible due to an error. One cut-sheet form loading roller 23 is therefore moved in the direction of arrow E and form stopper 25 is moved in the direction of arrow F to the open position of the loading roller closing mechanism (step 187), a back-feed failure is reported (step 188), and control returns to the main procedure shown in FIG. 15.

Note that personal check 16 can be removed by opening the loading roller closing mechanism because it is held only by cut-sheet form loading rollers 23 at this time. The eject operation is therefore not executed.

If the remaining number of steps is not 0 when stepping motor 45 stops (step 182), personal check 16 is fed in the direction of arrow B for a number of steps equivalent to the distance from paper detector 24 to form stopper 25. The back-feed success flag is therefore set (step 184), and control returns to the main procedure shown in FIG. 15.

It is to be noted that while the back-feed operation executed by the present embodiment to repeat the MICR code reading process is controlled by the method shown in FIGS. 19, 20, and 21 and described above, re-reading can also be enabled by simply feeding personal check 16 in the direction of arrow C for a number of steps equivalent to the number of read steps. In this case back-feed failure detection is not executed, and the corresponding evaluation steps are therefore not required.

In addition, re-reading is also possible if the leading edge of personal check 16 is fed in the direction of arrow C from magnetic head 31 to the area near the cut-sheet form insertion area, and personal check 16 need not be fed all the way to cut-sheet form insertion position 26.

It is also possible to execute re-reading while feeding personal check 16 in the direction of arrow C, and to advance personal check 16 in the direction of arrow B to cut-sheet form print start position 27 when reading in this reverse direction is completed.

Re-sending the recognition results

Figure 22:
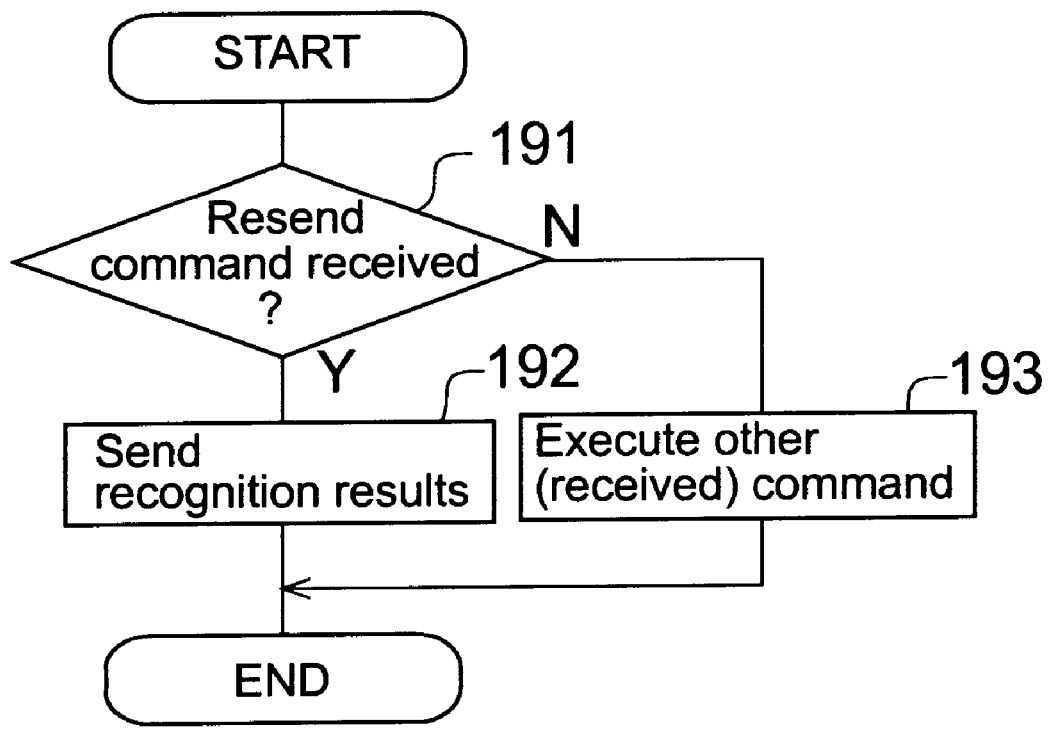
FIG. 22 is a flow chart of the re-send command process in the printer shown in the preferred embodiment of the invention.

FIG. 22 is a flow chart of the process executed for the command instructing the recognition results to be resent during normal operation, i.e., when the MICR code read function is not selected, of the printer according to the present embodiment.

When the re-send command is received (step 191), the printer sends the data stored to recognition result storage means 72, i.e., the recognition results of the most recent MICR code reading operation, to the host device (step 192). As described above, status data indicating whether the read operation has been executed for the maximum per check limit is also sent with the recognition results. This status data is only meaningful within the context of a single MICR code reading operation, however, and is therefore set to indicate whether the maximum number of read operations has been executed, i.e., whether re-reading is prohibited or not.

When any other command is received, that command is executed (step 193).

Check processing by the present embodiment

Figure 23:
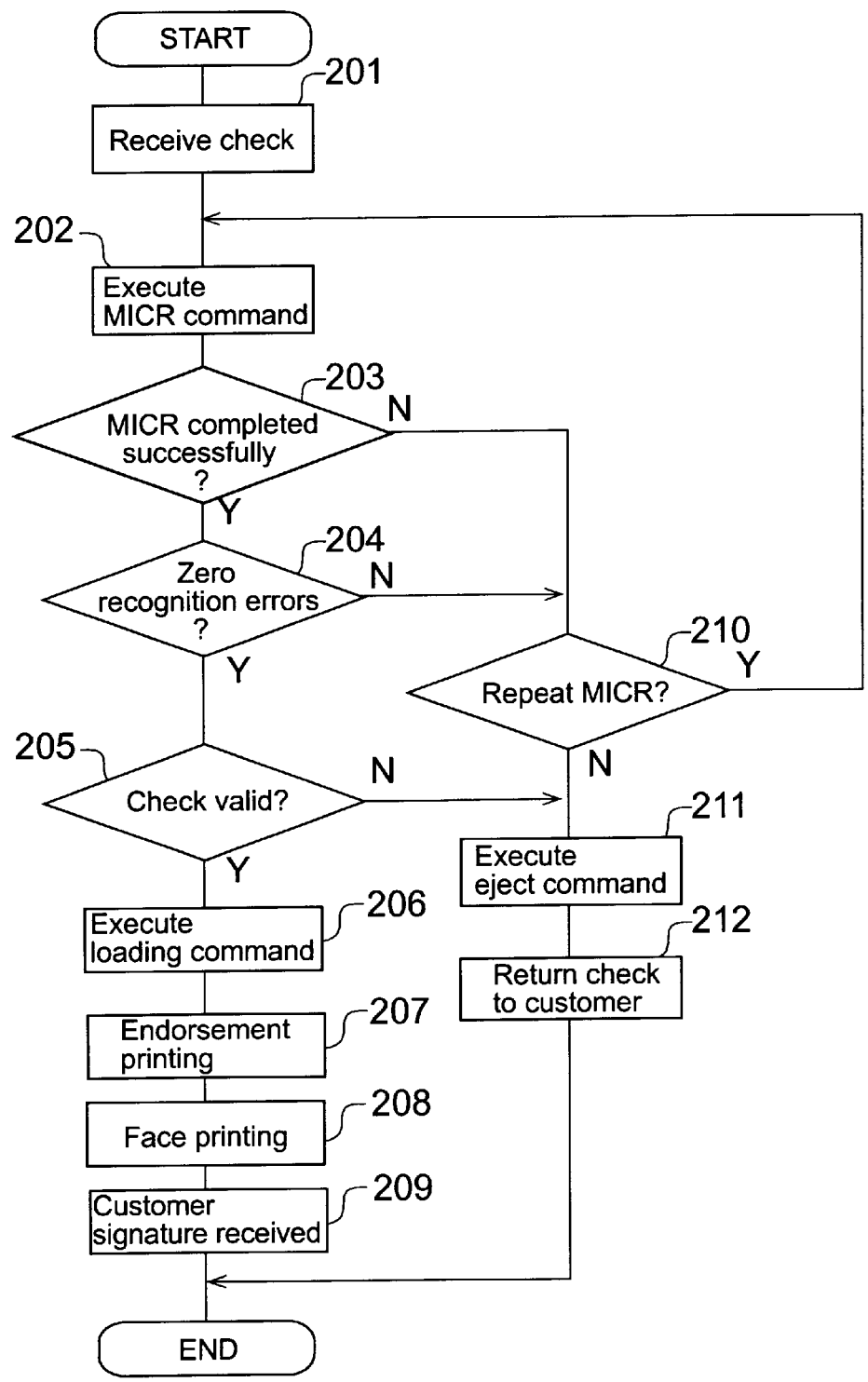
FIG. 23 is a flow chart of the check processing operation using the printer shown in the preferred embodiment of the invention.

FIG. 23 is a flow chart of a check processing procedure executed in a retail establishment, for example, when the printer of the present embodiment is controlled by the first control method described above. It is to be noted that in the following description of this flow chart, a POS terminal is used by way of example only as host device 1 shown in FIG. 12.

When the operator receives a check from a customer (step 201), the operator operates the POS terminal to complete the transaction by reading the MICR code and then endorsing the check as appropriate. The POS terminal therefore enters the check processing mode, and sends a command to the printer apparatus of the present invention to scan the MICR code. When the printer receives, interprets, and executes the command, it enters the check insertion standby mode. When the operator inserts the check for endorsement, the printer reads the MICR code printed to the check by executing the procedure shown in FIGS. 14 and 15, and sends the recognition results to the POS terminal (step 202).

The POS terminal then determines by interpreting the received status information whether MICR code reading was normally completed (step 203). If reading was completed normally, the received recognition results are confirmed (step 204), and if the required character recognition is confirmed, the check is determined to be valid or invalid (step 205).

Check validity can be accomplished, for example, by comparing the recognized account numbers with a database of invalid account numbers. If the check is valid, the POS terminal outputs a command to load the check to the cut-sheet form print start position. The printer thus executes the load command, and the check is loaded to the cut-sheet form print start position (step 206). After step 206 the check can be imprinted by executing the same procedure used to print to any other cut-sheet form. The POS terminal therefore sends the endorsement data and the cut-sheet form eject command to be executed after printing is completed to the printer. The printer then prints and ejects the check in response to the received commands (step 207).

The POS terminal then outputs a command to load a cut-sheet form for printing, for example, the store name and check amount. The printer thus executes this command and enters the cut-sheet form insertion standby state. When the operator inserts the check face-up to the cut-sheet form insertion position for printing, the printer loads the check to the cut-sheet form print start position. When loading is completed., the POS terminal sends the print data and the cut-sheet form eject command to the printer, which then prints and ejects the check accordingly (step 208).

When the check is ejected, the operator hands the check to the customer for confirmation of the face amount and signing, receives the check back, and completes the transaction (step 209).

If MICR code reading was not normally completed (step 203), it is possible that either the operator inserted the check in the wrong direction, or a paper jam occurred and processing was interrupted. The operator must therefore decide to repeat or not repeat MICR code reading (step 210). If MICR code reading was not normally completed because required characters in the MICR code could not be recognized (step 204), the POS terminal determines whether to repeat MICR code reading (step 210).

When it is determined to repeat MICR code reading, the POS terminal sends the read MICR code command again. If the previous MICR code reading operation was completed normally, the check will be at the re-read start position, and rereading can be executed. If reading was not completed normally, or if MICR code reading was executed the maximum allowable times per check, the check will have already been ejected. The printer therefore enters the printer insertion standby state, and re-reading is executed once the operator inserts the check to the cut-sheet form insertion position again (step 202). After re-reading is completed, the process from step 203 is executed again.

When it is determined to not repeat MICR code reading (step 210), the POS terminal sends the eject check command. The printer therefore executes the eject command and ejects the check (step 211). If reading was not normally completed, the check is already ejected when reading is completed. Execution of the eject command in this case will be invalid because the MICR code read function has already terminated, and nothing will happen.

When the check is determined invalid and when MICR code reading fails, the operator returns the check to the customer and must receive payment in cash or by some other means.

It is to be noted that while printing the payee and check amount to the face of the check has been described in the present embodiment above, this part of the above process may be omitted when the customer completes the face side of the check.

Control method 2

Figure 24:
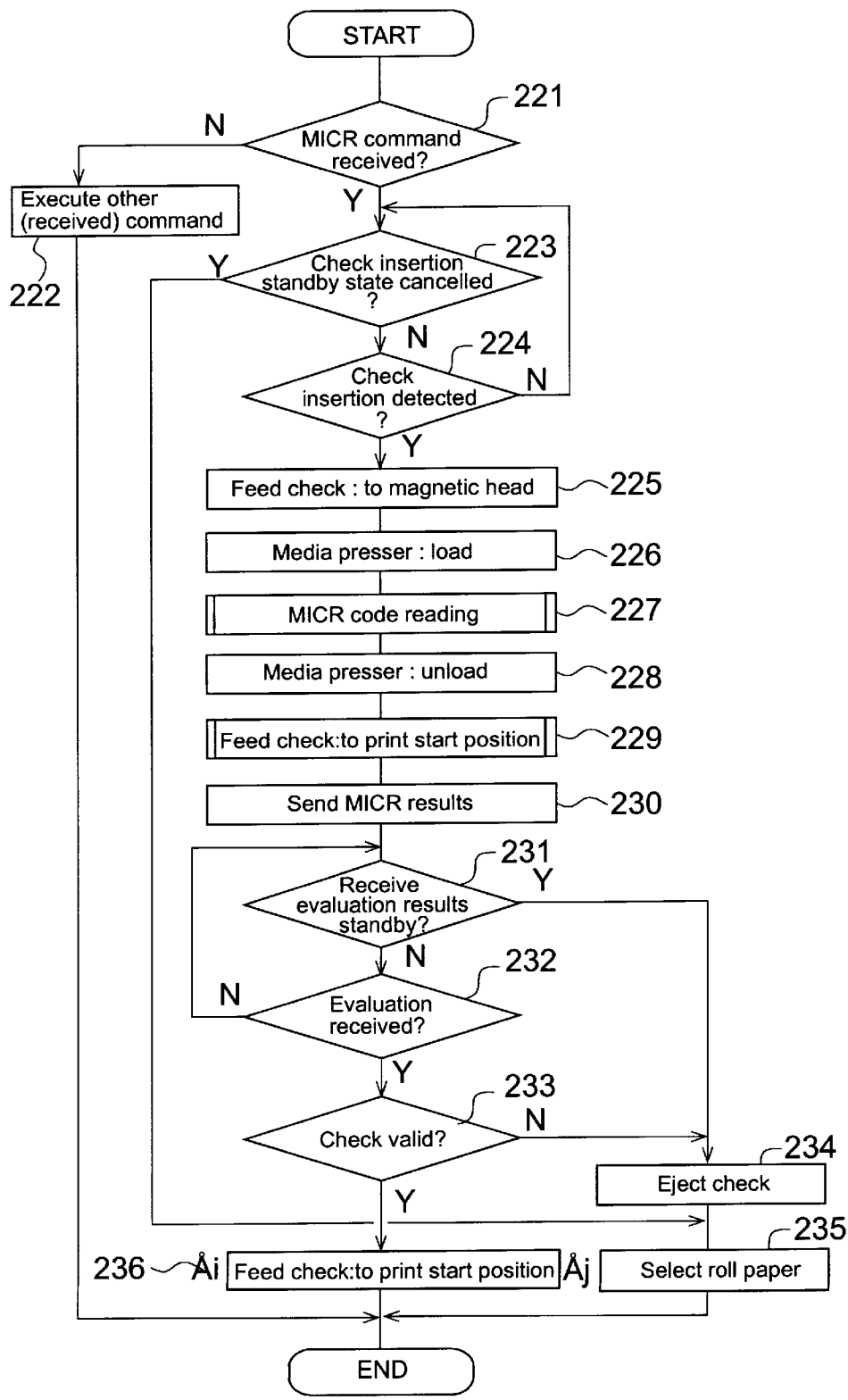
FIG. 24 is a flow chart of a second control method according to the present invention.

The second control method of the present invention references with the host device the recognition results obtained during MICR code reading, and determines the next process to execute based on those results. A flow chart of this second control method is shown in FIG. 24.

The first step 221 determines whether the command received from the host device is a command relating to MICR code reading. If the received command is not the read MICR code command, the MICR code reading process is aborted and the received command is executed (step 222).

If the received command is the load check command or read MICR code command, the printer is set to the cut-sheet form insertion standby state.

If the input command is canceled before a check is inserted when in the cut-sheet form standby state (step 223), the cut-sheet form standby state is canceled, paper transportation drive power transfer system switching mechanism 94 is switched to drive roll paper transportation rollers 41a, 41b, printing to roll paper is enabled (step 235), and the process terminates. Command cancellation can be effected by the host device inputting a cancel cut-sheet form standby command, by the operator operating a switch, or other means.

When the operator inserts the check face down for endorsement printing, check insertion is confirmed by paper detector 24 (step 224).

Cut-sheet form loading rollers 23 are then closed (moved in the direction of arrow D) to hold the check, and form stopper 25 is retracted from paper path 20. Stepping motor 45 is then operated to feed personal check 16 a predetermined distance in the direction of arrow B, thereby advancing the leading edge of personal check 16 to the position of magnetic head 31 (step 225). Print head 13 is then moved to the edge outside the printing area in the direction of arrow K, media presser 33 is moved toward magnetic head 31, and the leading edge of personal check 16 is thus held between media presser 33 and magnetic head 31. Current is simultaneously supplied to electromagnet 32 to remagnetize the MICR code. The MICR code reading process (step 227) executed thereafter is the same as that described in the first embodiment above, and further description is therefore omitted below.

When MICR code reading is completed, print head 13 is moved back within the printing area, and media presser 33 is returned to the print position separated from magnetic head. 31. The read data is then interpreted by read data interpreter 71, and the recognition results are stored temporarily to RAM 77.

The process where by the recognized information is then sent to host device 1 and confirmed is described next.

The MICR code recognition results are output to host device 1 through data transmission means 73 and interface 75 (step 230). When transmission of the recognition results is completed, host device 1 determines the validity of the check from which the information was read based on the received recognition results. The printer is set to the standby state in order to receive the evaluation result (step 231). If check processing is canceled during this standby state (step 231), the remainder of the procedure is aborted, and the check is ejected. Command cancellation can be effected by the host device inputting a cancel receive evaluation result standby command, by the operator operating a switch, or other means.

When the evaluation result is received (step 232), the content of the result, i.e., whether the check is valid or invalid, is confirmed (step 233). If the check is invalid, the form is ejected (step 234), roll paper is selected (step 235), and the procedure terminates. Note that the process for ejecting a check is the same as that described in the first embodiment above, and further description thereof is omitted below.

If the check is valid, however, personal check 16 is advanced to the print start position (step 236). The direction in which paper feed occurs at this time to load personal check 16 to cut-sheet form print start position 27 shown in FIG. 3 depends upon the paper feed distance traveled during MICR code reading. Specifically, if the leading edge of personal check 16 has not reached cut-sheet form print start position 27, personal check 16 is advanced in the direction of arrow B; if the leading edge has passed cut-sheet form print start position 27, personal check 16 is fed in the direction of arrow C. When personal check 16 is fed in the reverse direction, cut-sheet form loading rollers 23 are closed before paper feed begins to hold personal check 16. When feeding to cut-sheet form print start position 27 is completed, cut-sheet form loading rollers 23 are opened.

It is to be noted that each of the steps described above may be executed in response to separate commands received from the host device, or macro commands covering the plural steps required for MICR code reading or printing may be input from the host device with the plural steps executed for these separate processes managed on the printer apparatus side.

It is to be noted that while the above embodiments have been described with MICR code reading executed with the check inserted in the position enabling endorsement printing, it will be obvious that MICR code reading can also be executed and then followed by printing the face of the check by disposing magnetic head 31 and magnet 32 symmetrically to the center line of paper path 20. In order to print on the face of a personal check in succession to MICR reading without reversing the check, both the magnetic head and magnet must be disposed on upper surface of the paper path. Moreover, the distance between them and the right end of the paper path, which is the reference position for MICR reading, must be the same as one in the printer for "endorsement printing" because of the requirement of the MICR check standard. In this context, the position of the magnetic head in the printer for "face printing" and one for "endorsement printing" are disposed symmetrically with each other to the center plane of upper and lower surfaces of the paper path. Because the purchase amount is commonly written to the face, and must be written both in numbers and text, processing requires more time. If the information is printed by an integrated processing apparatus, processing can be reliably executed in a short period. It is possible to enable selection of the process following MICR code reading by providing magnetic head 31 on both sides of the paper path and changing the orientation of the check as necessary for endorsement or face printing at check insertion. In this case, an integrated processing apparatus can automatically select either endorsement printing or face printing according to the side on which the MICR code is detected. It is also not necessary to limit the number of magnetic heads disposed to the paper path to one, and plural magnetic heads may be arrayed to take plural MICR code readings and compare the data obtained from the plural readings as a means of improving data reliability. Such an arrangement also makes it possible to read MICR codes printed to a larger (plural line) printing area.

It is also not necessary to limit an integrated processing apparatus to one printing head, and both check face and endorsement printing can be enabled with a single pass through the paper path by providing plural print heads on both sides of the paper path.

As described hereinabove, an integrated processing apparatus according to the present invention is an apparatus capable of smoothly executing plural processes using a single paper path, specifically, capable of both reading the MICR code and printing an endorsement with a single pass of the check. Check processing in retail and other businesses can therefore be simplified by means of an integrated processing apparatus of the present invention. The per customer processing time can also be shortened, and customer service improved, by processing personal checks using an integrated processing apparatus of the present invention. Moreover, because a mechanism is provided for pressing the personal check to the magnetic head, the MICR code recognition rate can be improved even with checks that are wrinkled or folded. The effects of external noise can also be reduced because a magnetic shield is provided around the magnetic head, and reading can thus be more reliably accomplished.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

Second Embodiment

Figure 27:
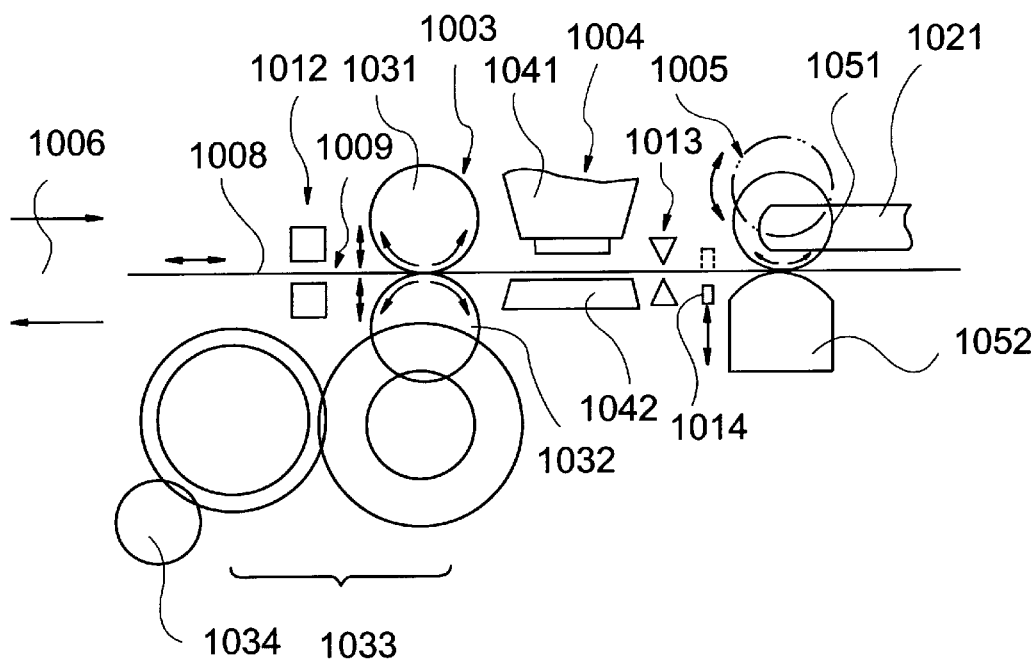
FIG. 27 is used to describe the operation of the recording media information detection apparatus shown in FIG. 25.

FIG. 27 is a simplified view showing the major operating components of the second embodiment of an information detection apparatus for recording media processing according to the present invention. As shown in FIG. 27, this information detection apparatus for recording media processing comprises an insertion opening 1006 at the left end of the apparatus as seen therein. The insertion opening 1006 leads in sequence to paper transport roller 1031, print head 1041, and presser roller 1051 disposed on the top side of the transportation path 1009 as also seen in FIG. 27.

Opposing paper transport roller 1031, print head 1041, and presser roller 1051 with transportation path 1009 disposed therebetween are, respectively, paper transport roller 1032, platen 1042, and magnetic head 1052, which is the detection means. Paper transport roller 1031 and paper transport roller 1032 thus constitute transportation mechanism 1003, print head 1041 and platen 1042 constitute printing mechanism 1004, and presser roller 1051 and magnetic head 1052 constitute reading mechanism 1005.

Paper transport rollers 1031 and 1032 and presser roller 1051 can move vertically up and down. Presser roller 1051 and magnetic head 1052, and the part of transportation path 1009 formed thereby, are a single unit.

Figure 25:
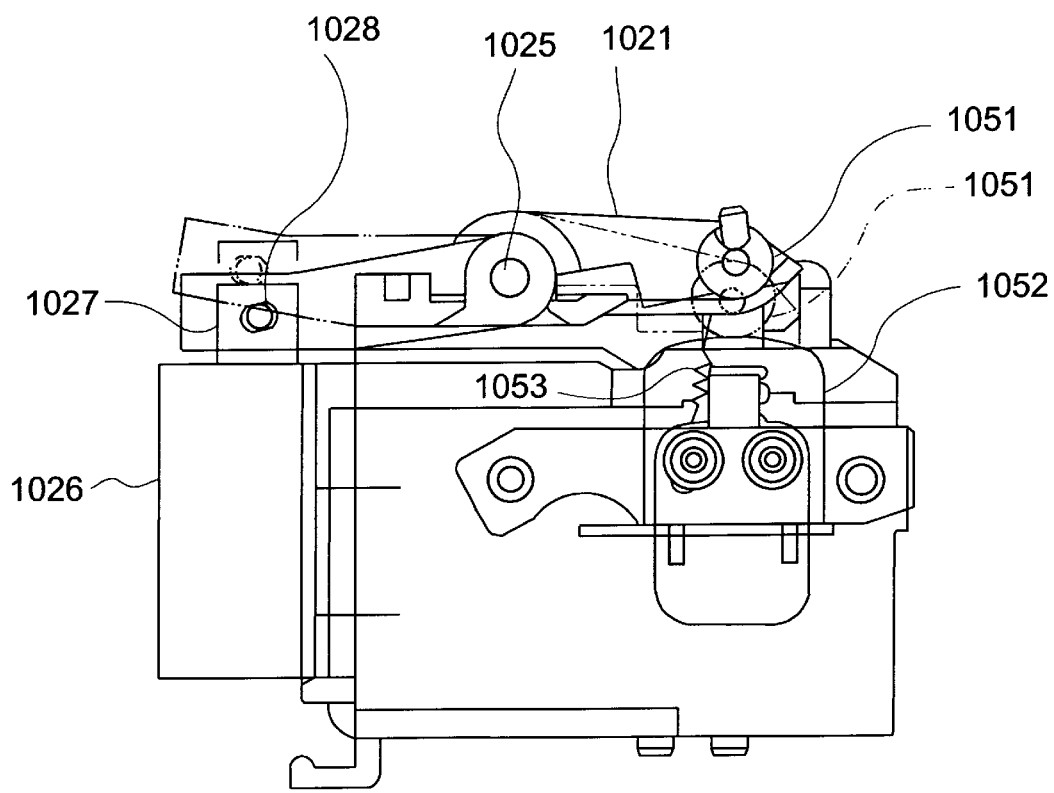
FIG. 25 is a side view of a recording media information detection apparatus according to the second embodiment of the present invention.
Figure 26:
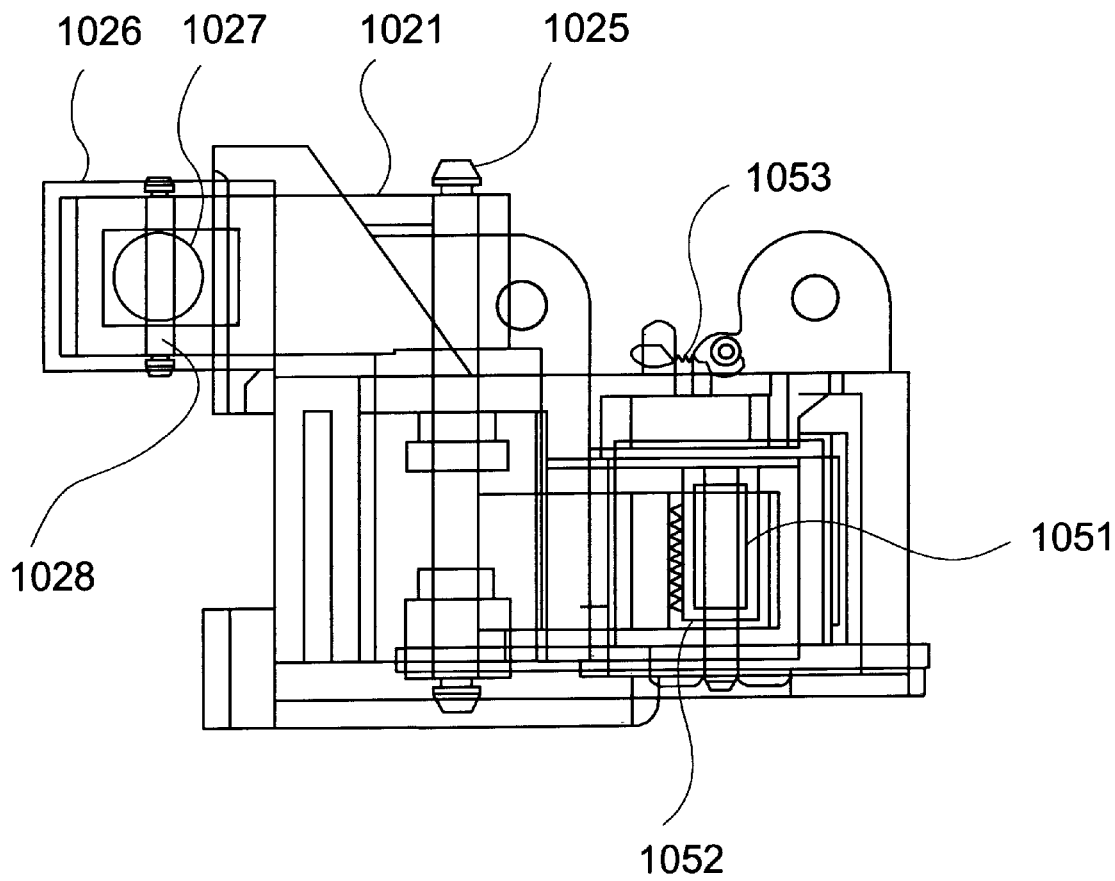
FIG. 26 is a plan view of a recording media information detection apparatus shown in FIG. 25.

A side view of this unit is shown in FIG. 25, and a plan view in FIG. 26.

Presser roller 1051 is mounted on one end of arm 1021, the other end of which is connected to plunger 1027 by means of shaft 1028. The middle of arm 1021 is supported by shaft 1025 in a freely rocking manner such that plunger 1027 operates vertically when current is supplied to a solenoid contained in housing 1026, thus causing presser roller 1051 to either contact or separate from magnetic head 1052. It should be noted that as described below the solenoid housed in housing 1026 is a self-hold solenoid that drives plunger 1027 up or down depending upon the direction of current flow, and uses a magnet to hold plunger 1027 in the position it was at when the current supply is stopped.

Self-hold type solenoids generally have two operating positions: "pull" and "open." When in the pull position the plunger is pulled to and held by the magnet built in to the solenoid. When in the open position the plunger is repulsed by the magnet and stops at a position separated from the magnet. The plunger moves between these two positions depending upon the direction of current flow.

More specifically, the magnetic field strength produced by current flow in a particular direction pulls the plunger from the open position to the pull position. When the current flow is reversed, the field strength works in the opposite direction to move the plunger from the pull position to the open position. When the current flow is stopped, the plunger is held by a magnet in the position at which the plunger was when the current flow stopped. Therefore, the force of magnetic attraction acting on the plunger in the pull position is great, and magnetic repulsion acting on the plunger in the open position is relatively weak.

Presser roller 1051 is thus separated from magnetic head 1052 when the solenoid of the present embodiment is in the pull position, and presses against magnetic head 1052 when in the open position. The pressure applied by presser roller 1051 on magnetic head 1052 can thus be set to a substantially constant value using the elastic force of presser spring 1053 since the effects of force from the magnet when pressure is applied can be made small.

It should be noted that a magnetic latching type solenoid is used for self-hold solenoid in the present embodiment, but the invention shall not be so limited and a leaf spring type solenoid can be used. It should be also noted that a helical spring is used for presser spring 1053 in the present embodiment, but the invention shall not be so limited and other types of elastic members, including leaf springs and torsion coil springs, can be used.

The operating sequence of the recording media information detection apparatus comprising this unit is described below with reference to FIG. 27.

In the default state paper transport roller 1031 and paper transport roller 1032 are separated and transportation mechanism 1003 is open. Presser roller 1051 is also separated from magnetic head 1052, and reading mechanism 1005 is open.

When the information detection apparatus receives a MICR read mode signal from the host device, current flow in a particular direction is supplied to the magnetic latching type solenoid described above, thereby causing plunger 1027 to travel down to the solenoid pull position and presser roller 1051 to lift to the open roller position. This operation confirms that presser roller 1051 is reset to the default open roller state before operation continues even when some overpowering external force has overcome and canceled the pull position of the magnetic latching type solenoid. When this operation is completed an operating indicator lights to notify the operator that the information detection apparatus is ready for normal use and operation.

It should be noted that a photo interrupter or other known detector means can be used on an end of arm 1021 to detect whether arm 1021 (plunger 1027) is in the pull position. If arm 1021 is already in the pull position, the above operation can be skipped because the path between presser roller 1051 and magnetic head 1052 is already open.

When reading mechanism 1005 is open and presser roller 1051 is raised, a foam stop 1014 provided between printing mechanism 1004 and reading mechanism 1005 also slides to the up position (shown by a dotted line in FIG. 27) blocking transportation path 1009. When a check is then inserted from insertion opening 1006, the leading edge of the check contacts foam stop 1014, and the check is thus positioned in transportation path 1009.

Paper detector 1012, for detecting the presence of a check, is disposed between insertion opening 1006 and transportation mechanism 1003, and a similar paper detector 1013 is disposed between printing mechanism 1004 and foam stop 1014. When paper detectors 1012 and 1013 detect that a check has been inserted to transportation path 1009, the control unit of the recording media information detection apparatus operates transportation mechanism 1003 so that the check is held by paper transport rollers 1031 and 1032, and then retracts foam stop 1014 from transportation path 1009. Note that the operating mechanism of the paper transport rollers and foam stop 1014 can be achieved using various known configurations such as a plunger and linkage. A counter for indicating the paper feed position is also reset at this time. Note that the counter in this embodiment is provided in the control circuit (not shown in the figures) controlling stepping motor 1034 for paper transport. Note also that the counter increments or decrements according to the direction and amount of stepping motor 1034 rotation.

Detectors 1012 and 1013 are preferably constituted by photodetectors. As will be appreciated by one of ordinary skill in the art, any other type of suitable detecting mechanisms, such as mechanical switches, proximity detectors and the like, may be utilized.

Rotation of stepping motor 1034 is transferred by speed reducer 1033 to drive paper transport rollers 1031 and 1032, thereby transporting the check through transportation path 1009 (forward) into reading mechanism 1005. When paper detector 1012 then detects the trailing end of the check, the check is advanced a limited known distance and thus positioned so that the check does not leave transportation mechanism 1003. The paper transport rollers 1031 and 1032 are then stopped, and arm 1021 is operated so that presser roller 1051 presses the check against magnetic head 1052. Note that arm 1021 is operated by the magnetic latching type solenoid, and current flow to the magnetic latching type solenoid can therefore be stopped once the check is positioned against magnetic head 1052. This makes it possible to suppress magnetic noise resulting from noise in the current supply and switching noise from other electronic devices.

Note that check 1008 shown in FIG. 27 is inserted face down so that the side on which the desired information printed in magnetic ink contacts magnetic head 1052.

When paper transport rollers 1031 and 1032 are then driven in the opposite direction the check is transported in the reverse direction toward insertion opening 1006. Note that the check is pressed by presser roller 1051 against magnetic head 1052 at this time so that an appropriate amount of friction acts on the check. Tension corresponding to the combination of this friction and the drive force from paper transport rollers 1031 and 1032 thus acts on the check to straighten wrinkles or folds, for example, and thereby make it easier to assure good contact between the check and magnetic head 1052.

The tension acting on the check can be increased in various ways, including substituting a sliding presser for presser roller 1051 or providing a mechanical resistance such as a damper producing viscous drag on the presser roller 1051 bearing. Referring back to FIG. 25, note that the sliding presser in this example produces a sliding friction between the presser and the check. In these cases the position of shaft 1025, which functions as the fulcrum of arm 1021, is preferably moved away from presser roller 1051 closer to insertion opening 1006. By thus shifting the fulcrum away from presser roller 1051, the load of the presser roller 1051 bearing acts on arm 1021 in the direction increasing the pressure of presser roller 1051 against magnetic head 1052.

When reverse paper transport, i.e., paper transport in the direction toward insertion opening 1006, starts, a blank area of the check containing no magnetic ink characters moves over magnetic head 1052. This blank area can thus be used to measure by means of magnetic head 1052 the background level of magnetic noise affecting MICR reading. This magnetic noise signal level can also be stored.

As paper transport rollers 1031 and 1032 continue to transport the check and the area in which magnetic ink is printed passes over magnetic head 1052, magnetic head 1052 outputs a magnetic ink detection signal. This signal is an analog signal and converted to a digital signal by a signal processing circuit not shown in the figures and stored to memory, also not shown in the figures, on a specific cycle.

The magnetic ink detection signal continues to be stored as the check continues to be transported at a particular speed. After the leading edge (now the trailing edge) of the check passes back over magnetic head 1052, magnetic head 1052 again measures the magnetic noise level. The average of this noise level and the magnetic noise level obtained from the blank check area above is then obtained to determine the background noise level. This process can be accomplished by a microprocessor or other known signal processing device using the signal processing circuit and memory mentioned above.

Figure 28:
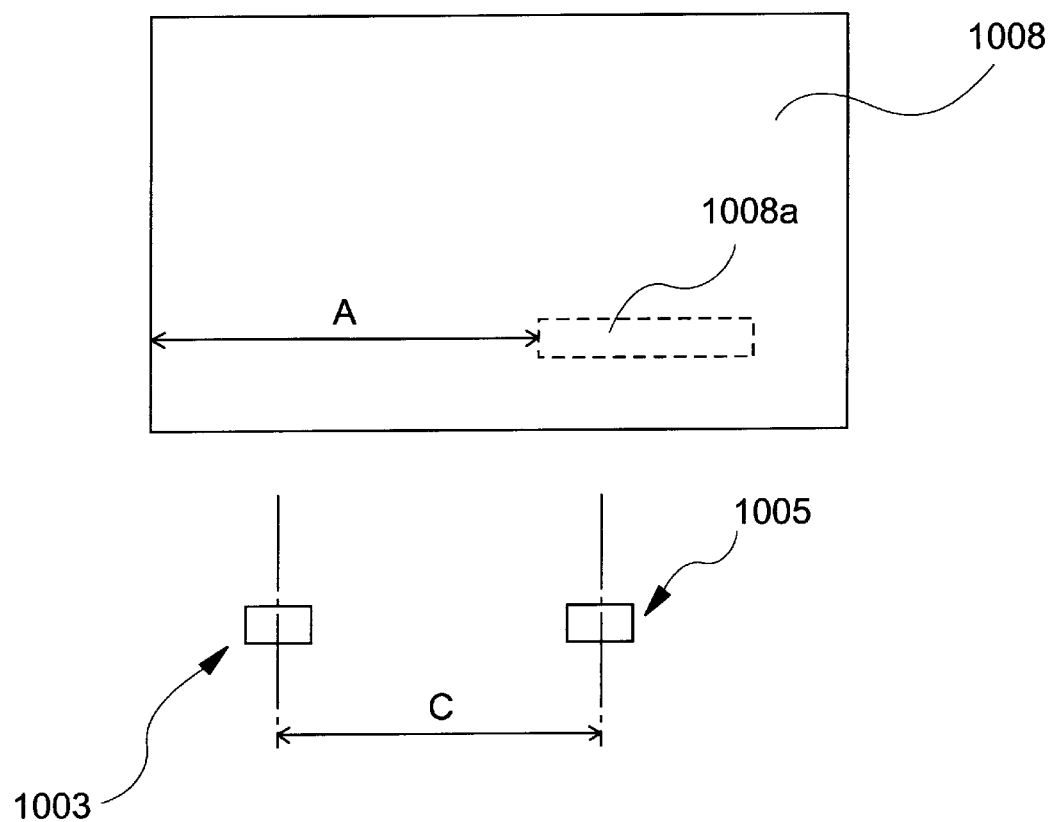
FIG. 28 is used to describe the relative positions of major components in the recording media information detection apparatus shown in FIG. 25.

When the check is transported forward into reading mechanism 1005 transportation stops at a position where the check continues to be held by transportation mechanism 1003, and the information printed with magnetic ink is then read as the check is transported in the opposite direction back toward insertion opening 1006 as described above. Turning to FIG. 28, as a result, the gap C between paper transport rollers 1031 and 1032 and reading mechanism 1005 must be less than the distance A from the edge of check 1008 to the area in which the magnetic ink information 1008a is printed. Note that passage of the leading edge of the check over magnetic head 1052 can be estimated from the gap between foam stop 1014 and magnetic head 1052 and the check travel distance.

After the check is transported to the endorsement printing start position, the magnetic latching type solenoid lifts presser roller 1051 from magnetic head 1052, and the MICR detection data is obtained by subtracting the background signal level from the magnetic ink detection signal. This detection data is then used to recognize the MICR code by means of a known method, and the MICR code is then sent to the host device. The host (or other credit source) on which the check is drawn to determine check validity based on the MICR code content, and sends the result to the information detection apparatus for recording media processing.

If the check is approved by the bank, the information detection apparatus for recording media processing operates the paper transport rollers 1031 and 1032 according to the print data from the host device to transport the check toward insertion opening 1.006 while printing the endorsement information using printing mechanism 1004. When the printing process is completed the check is ejected from insertion opening 1006 to thus finish the check processing sequence combining MICR code reading and endorsement printing.

It should be noted that depending upon the printing start position it may be necessary to again transport the check in the forward direction toward reading mechanism 1005 (luring the printing process, and the magnetic latching type solenoid is therefore driven to release the pressure of presser roller 1051 on the check. Once the check is positioned to the printing start position, however, printing can be accomplished while the check travels in the reverse direction toward insertion opening 1006, and presser roller 1051 is therefore set to press against the check before printing starts in this embodiment. As described above, this applies tension to the check and straightens wrinkles in the check as the check passes through the transportation path inside printing mechanism 1004 to enable sharp, accurate printing. The pressure from presser roller 1051 is again released once printing is completed. Note that the pressure from presser roller 1051 is released after printing is completed because releasing presser roller 1051 during printing also changes the load on paper transport rollers 1031 and 1032 and can result in the printing position changing.

If the check is not approved by the financial institution or bank, printing process is not executed, and the check is restored to the same condition in which it was inserted. MICR code reading is then repeated and the host repeats the validity check. If the validity check is again failed, the check is ejected from insertion opening 1006 without printing an endorsement, an invalid check is indicated to the operator, and the MICR code reading and endorsement process ends.

Figure 29:
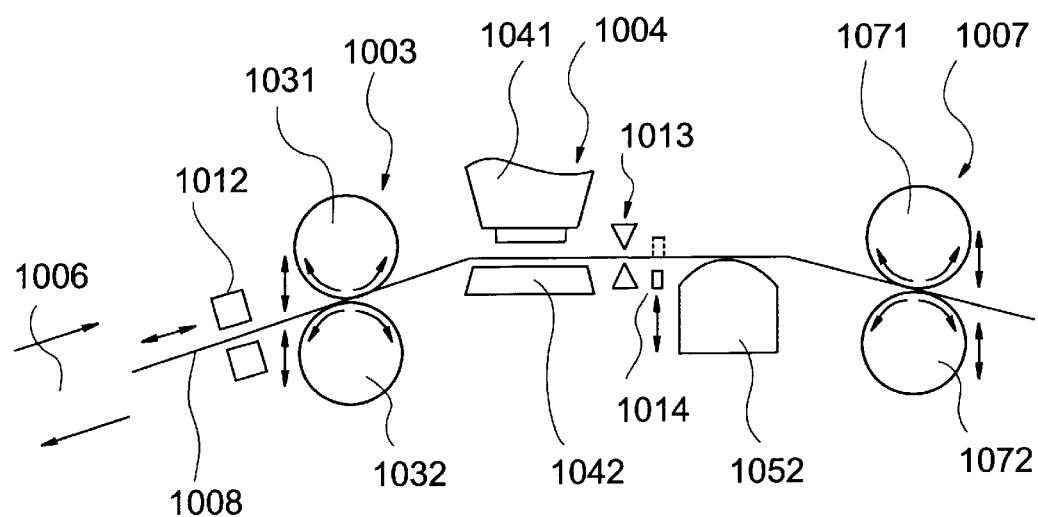
FIG. 29 is used to describe the operation of a recording media information detection apparatus according to another example of the second embodiment of the present invention.
Figure 30:
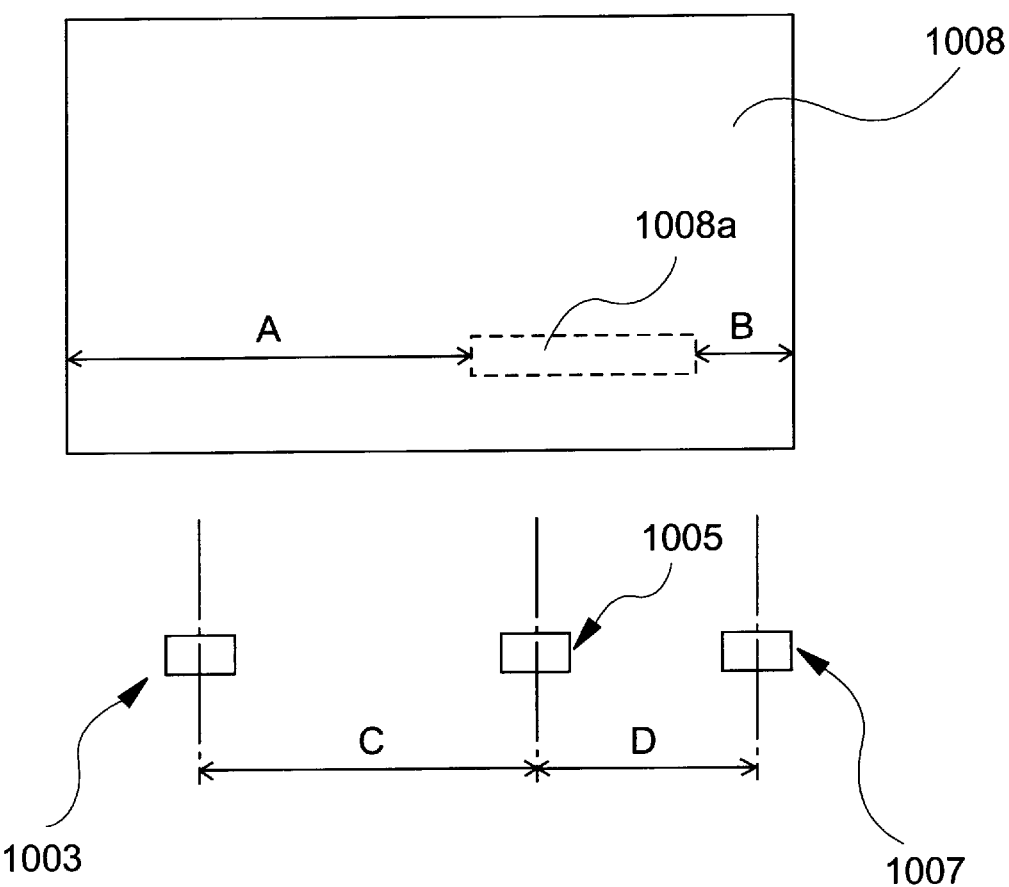
FIG. 30 is used to describe the relative positions of major components in the recording media information detection apparatus shown in FIG. 29.
Figure 31:
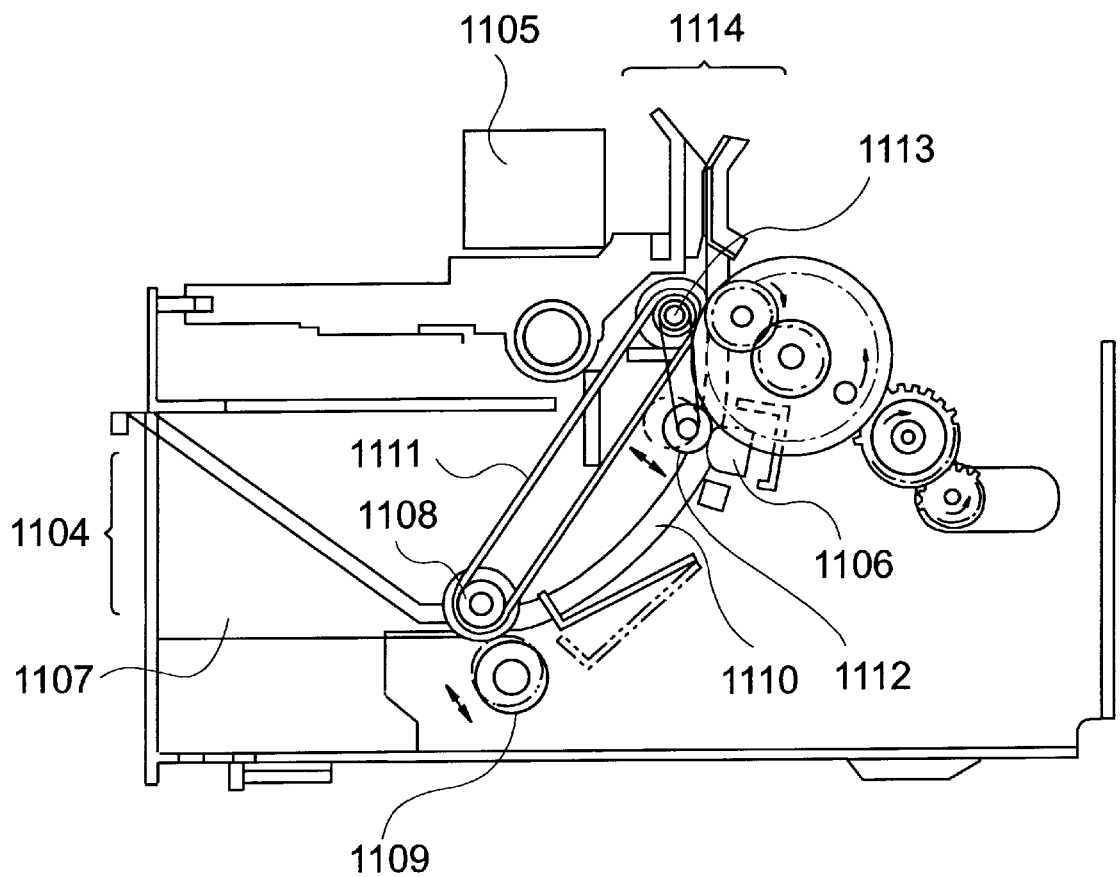
FIG. 31 is a simplified side view of a recording media information detection apparatus.

An alternative embodiment of the present invention is described below with reference to FIG. 29. As shown in FIG. 29, this information detection apparatus for recording media processing further comprises slide mechanism 1007 having opposing slide rollers 1071 and 1072. Note that slide rollers 1071 and 1072 can move vertically apart. Slide mechanism 1007 and transportation mechanism 1003 are also disposed at a position lower than printing mechanism 1004 and reading mechanism 1005 on the side of platen 1042 and magnetic head 1052. In the default (starting) position paper transport rollers 1031 and 1032 are separated and slide rollers 1071 and 1072 are separated.

The insertion (forward transportation) operation of the check is similar to that described above. When paper detectors 1012 and 1013 detect that a check has been inserted, the check is held and transported by paper transport rollers 1031 and 1032. When paper detector 1012 then detects the trailing end of the check, the check is advanced a limited known distance and positioned so that the check does not leave transportation mechanism 1003. The paper transport rollers 1031 and 1032 are then stopped and the check is clamped by slide rollers 1071 and 1072.

When the check is then transported in the reverse direction toward insertion opening 1006, tension corresponding to the combination of the friction from slide rollers 1071 and 1072 and the drive force from the paper transport rollers 1031 and 1032 acts on the check to straighten wrinkles or folds. Because paper transport rollers 1031 and 1032 and slide rollers 1071 and 1072 are positioned lower than magnetic head 1052, good contact between the check and magnetic head 1052 can also be easily maintained. As a result, this embodiment achieves the same effects as the first embodiment described above.

It should be noted that a second transportation mechanism similar to the first transportation mechanism 1003 described above can be substituted for slide rollers 1071 and 1072. In this case the transportation speed of the second transportation mechanism is set to be slower than the transportation speed of the first transportation mechanism 1003, thereby creating a speed differential. This speed differential results in tension applied to the check, and thus also achieves the same effects as the first embodiment described above.

In addition to the limitation of the first embodiment shown in FIG. 28, the distance D between magnetic head 1052 and slide rollers 1071 and 1072 (or the paper transport rollers of the second transportation mechanism) must be shorter than the distance B between the leading edge (insertion edge) of the check and the area to which the magnetic ink information 1008a is printed.

Figure 32:
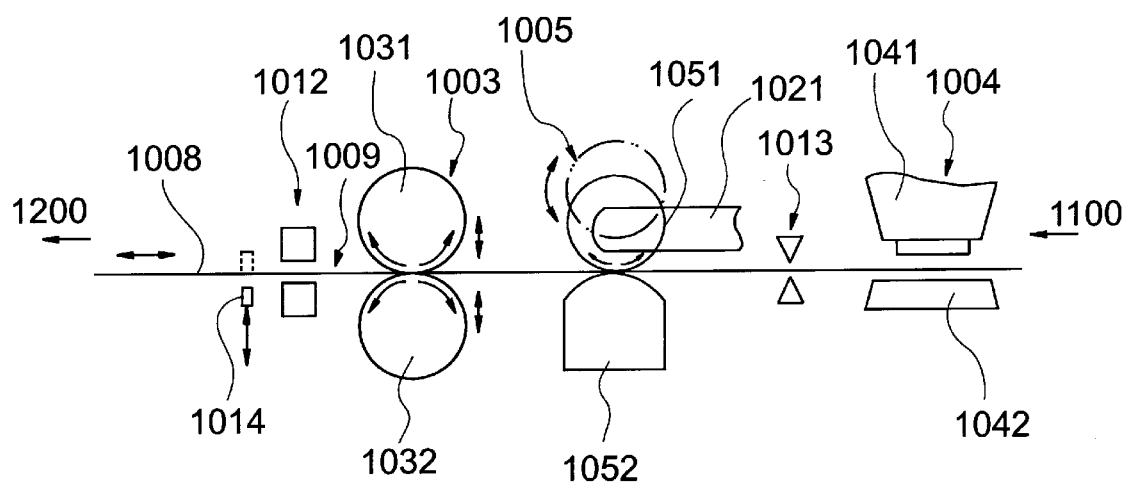
FIG. 32 is used to describe another example of the second embodiment.

FIG. 32 is an alternative example of the second embodiment of an information detection apparatus in which the recording medium is transported in a single direction. In this example the recording medium is inserted through inlet 1100 and exits through outlet 1200.

Referring specifically to FIG. 32, the information detection apparatus comprises, from right to left, an insertion opening 1100, outlet 1200, print head 1041, platen 1042, detector 1013, presser roller 1051, magnetic head 1052, transport roller 1031, transport roller 1032, detector 1012 and foam stop 1014.

The operating sequence of the recording media shown in FIG. 32 will now be described.

In the default state, paper transport rollers 1031 and 1032 are separated, presser roller 1051 is separated from magnetic head 1052, and foam stop 1014 is in the stop position (as shown in dotted lines).

The recording medium, such as a check, is inserted through inlet 1100 and is stopped by foam stop 1014. The check is then detected by detectors 1012 and 1013. In response to the detection of the check by detectors 1012 and 1013, a controller (not shown) causes both transport rollers 1031 and 1032 to close. Additionally, arm 1021 is operated so that presser roller 1051 presses the check against magnetic head 1052, and foam stop 1014 is moved from the stop position (dotted lines) to the processing position (solid lines). The mechanism for performing this operation is substantially similar to that described with respect to FIG. 27 and will not be repeated here.

Note that the check is transported in a single direction. Moreover the check is pressed by presser roller 1051 against magnetic head 1051 so that an appropriate amount of friction acts on the check. Tension corresponding to the combination of this friction and paper transport rollers 1031 and 1032 thus acts on the check to straighten wrinkles or folds, for example and thereby make it easier to assure good contact between the check and magnetic head 1052.

It should be noted that while the present invention has been described above as processing a check, the invention shall not be so limited. More specifically, any recording media information detection apparatus for reading information recorded to a recording medium and printing to said recording medium based on the content of the read information shall be considered within the scope of the present invention.

Furthermore, the recorded information shall not be limited to information recorded using magnetic ink, and can be any type of information detected using a contact type detection means. More specifically, it will be obvious to those skilled in the art that the present invention can also be applied in an information detection apparatus such as an optical detector for recording media processing comprised to read bar code information using a presser roller and a reflection type bar code reader, and then execute an appropriate printing process.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An information detection apparatus for recording media processing comprising:
    a data detector that detects information recorded on a recording medium while contacting the recording medium;
    a presser that presses the recording medium against said data detector;
    a presser moving mechanism that holds and sets said presser selectively to one of
        (1) a pressing position at which said presser presses the recording medium against said data detector to apply a load to the recording medium, and
        (2) an open position at which said presser does not press the recording medium against said data detector;
    a transportation mechanism that transports the recording medium in
        (1) a first direction in which the recording medium travels from said transportation mechanism toward said data detector,
        (2) and a second direction that is opposite the first direction;
    printing mechanism disposed between said data detector and said transportation mechanism that prints on the recording medium; and
    wherein said presser is set
        (1) to the open position when the recording medium is transported in the first direction for printing by said printing mechanism, and
        (2) to the pressing position at least while the recording medium is transported in the second direction and the information recorded on the recording medium is detected by said data detector so that tension caused by the load applied by said presser is applied to the recording medium.

2. An information detection apparatus for processing a recording medium having particular information recorded in a particular area on a first side thereof comprising:
    an insertion opening through which the recording medium is inserted into a transportation path;
    a transportation mechanism that transports the recording medium inserted through ;aid insertion opening through the transportation path in a selected one of first and second directions, wherein said transportation mechanism is arranged after said insertion opening in the first direction;
    a printing mechanism that prints on the recording medium, wherein said printing mechanism is arranged after said transportation mechanism in the first direction; and
    a reading mechanism that reads the particular information recorded on the recording medium, wherein said reading mechanism is arranged after said printing mechanism in the first direction;

a presser roller disposed with respect to said reading mechanism such that
(1) when the recording medium is transported in the first direction said presser roller separates from said reading mechanism and said printing mechanism prints on the recording medium; and
(2) when the recording medium is transported in the second direction the recording medium is pressed by said presser roller against said reading mechanism to read the particular information.

3. The information detection apparatus for recording media processing according to claim 2, wherein a printing process by said printing mechanism is executed on a second side of the recording medium.

4. The information detection apparatus for recording media processing according to claim 2, wherein the transportation path is substantially straight.

5. The information detection apparatus for recording media processing according to claim 2, wherein the particular information is recorded in magnetic ink, and said reading mechanism comprises a magnetic head.

6. The information detection apparatus for recording media processing according to claim 5, further comprising a self hold solenoid, wherein contact between said presser roller and the recording medium is established by said self hold solenoid such that magnetic noise is substantially absent while reading the particular information by said reading mechanism.

7. The information detection apparatus for recording media processing according to claim 2, wherein the particular information is printed on the recording medium, and said reading mechanism comprises an optical detector.

8. The information detection apparatus for recording media processing according to claim 2, wherein said transportation mechanism comprises;
   a single transport roller that holds and transports the recording medium;
   a drive mechanism that drives said single transport roller; and
   a transfer mechanism that transfers drive power from said drive mechanism to the transport roller.

9. An information detection method for recording medium processing in which particular information is recorded on at least one side of a recording medium, comprising the steps of:
   (a) detecting the presence of the recording medium inserted through an insertion opening;
   (b) transporting the recording medium with a transportation mechanism through a paper transportation path in a first direction towards a reading mechanism;
   (c) positioning the recording medium between a detector and a presser roller of the reading mechanism;
   (d) pressing the recording medium against the detector with the presser roller;
   (e) reading the particular information from the recording medium with the detector while transporting the recording medium in a second direction opposite the first direction as the recording medium is held in contact with the detector, wherein said presser roller and the transportation mechanism operate to apply tension to the recording medium;
   (f) printing on the recording medium while transporting the recording medium in the first direction; and
   (g) ejecting the recording medium from the insertion opening.

10. An information detection method for recording medium processing according to claim 9, wherein step (e) comprises measuring background noise and obtaining the information using the background noise.

11. An information detection method for recording medium processing according to claim 9, wherein step (f) comprises receiving a signal representing a validation of the information, and printing on the recording medium based on the content of the information.

12. An information detection method for recording medium processing according to claim 9, wherein step (f) comprises separating the presser roller from the detector before printing.

* * * * *